Jan. 3, 1933.   A. G. OGDEN   1,893,439
ART OF PHOTOPRINTING
Original Filed Jan. 10, 1930   14 Sheets-Sheet 2
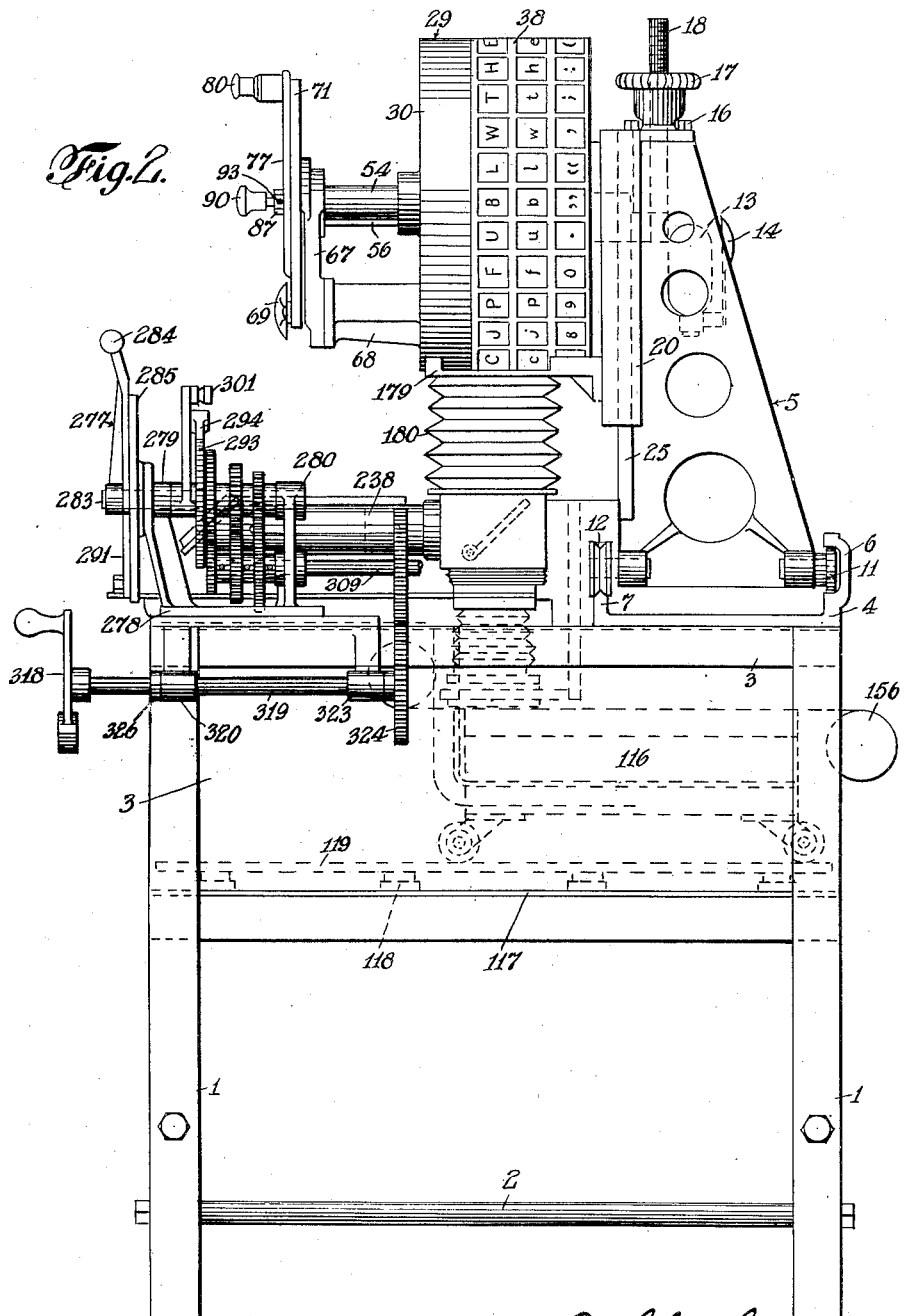

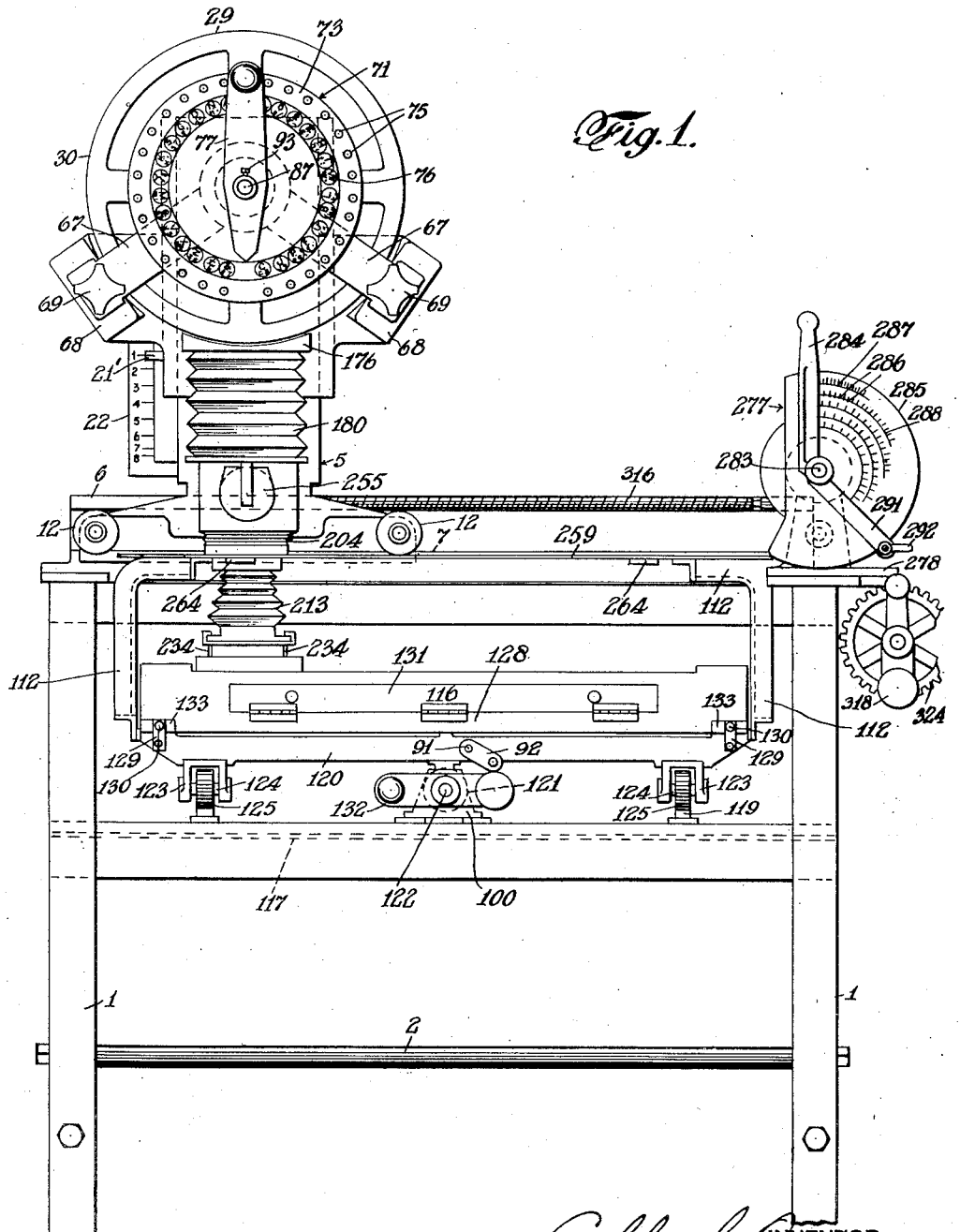

Jan. 3, 1933.　　　A. G. OGDEN　　　1,893,439
ART OF PHOTOPRINTING
Original Filed Jan. 10, 1930　　14 Sheets-Sheet 3
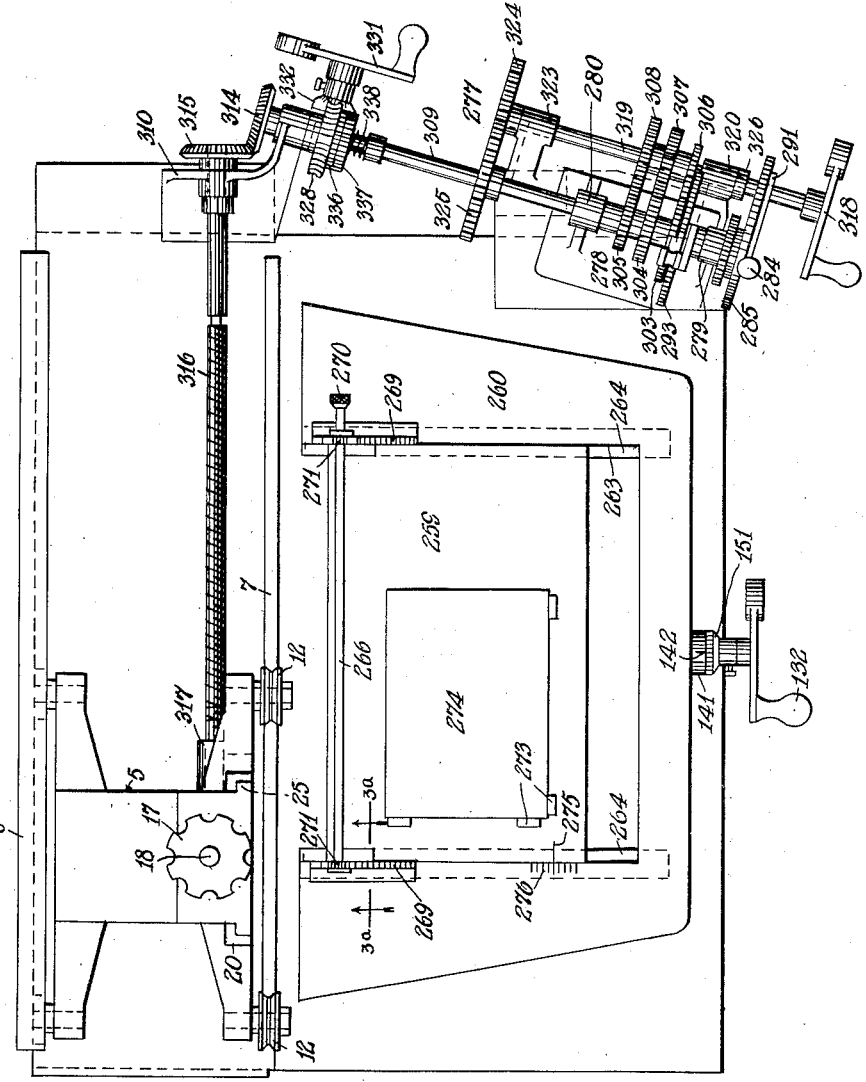
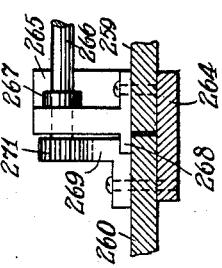

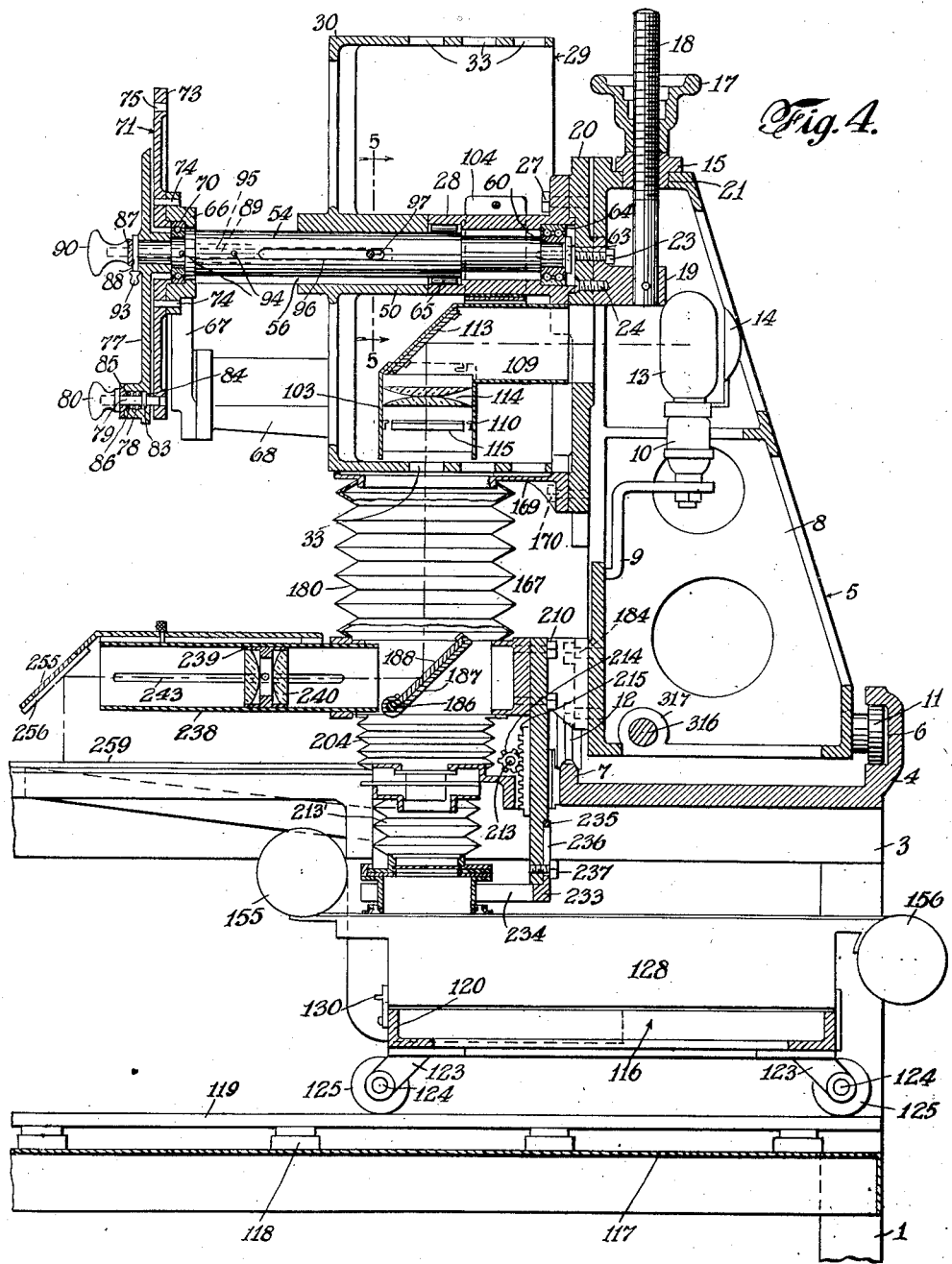

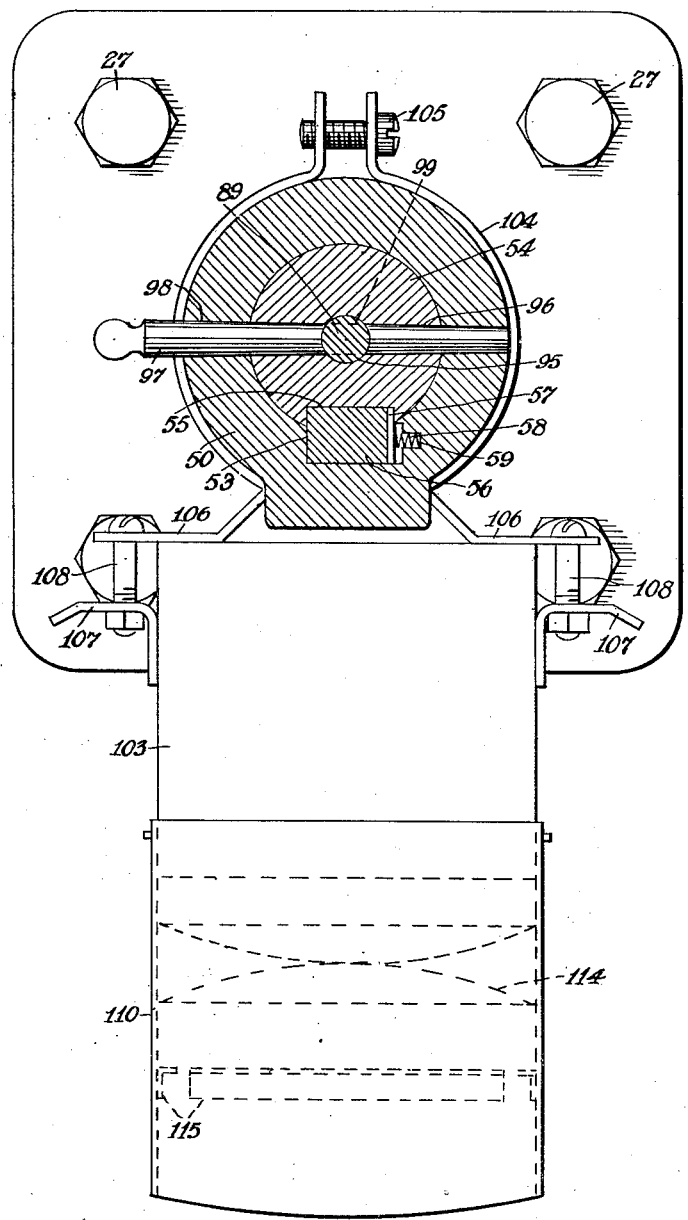

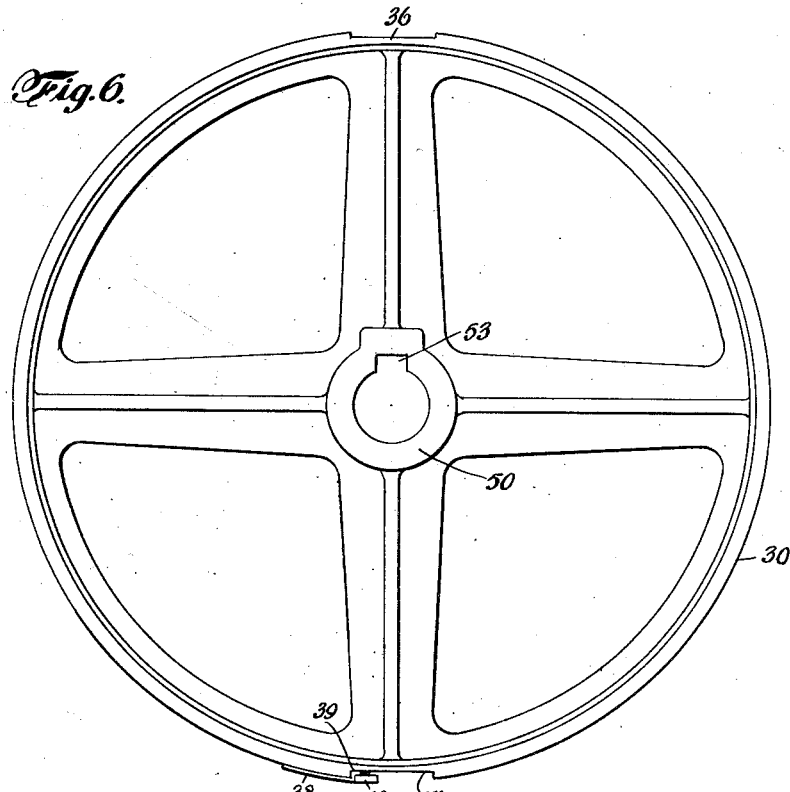
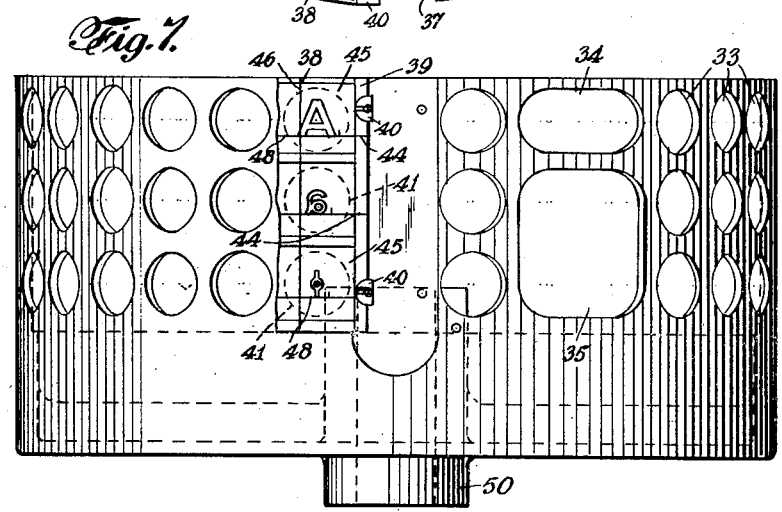

Jan. 3, 1933. A. G. OGDEN 1,893,439
ART OF PHOTOPRINTING
Original Filed Jan. 10, 1930 14 Sheets-Sheet 7
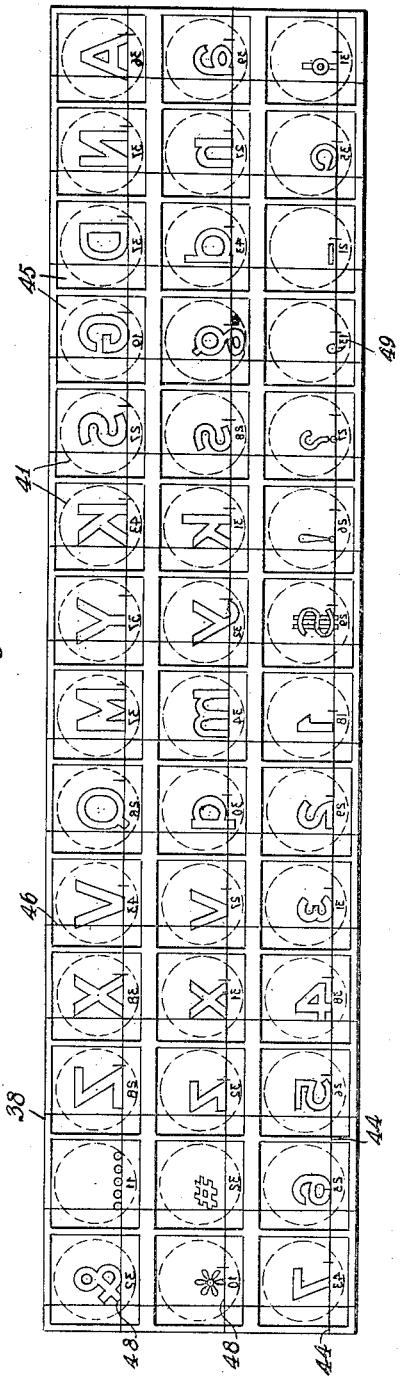
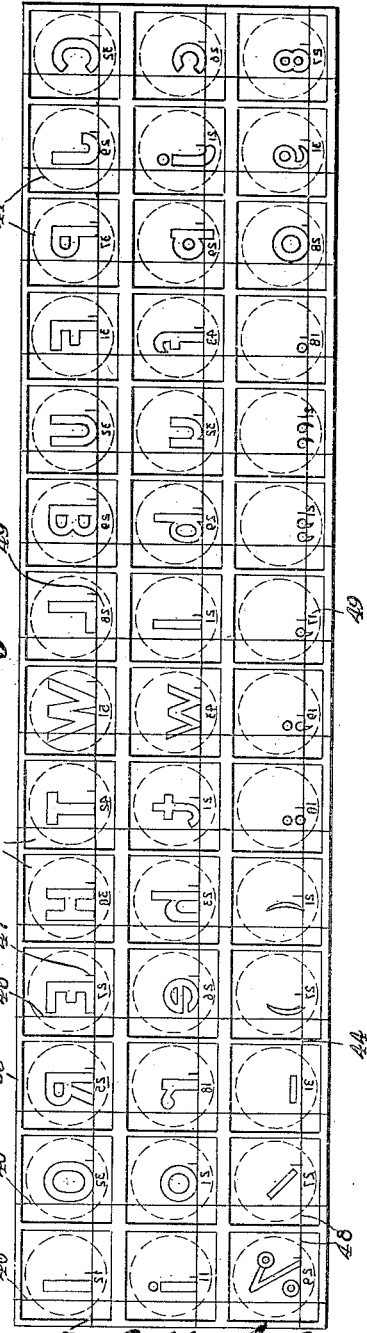

Jan. 3, 1933.  A. G. OGDEN  1,893,439
ART OF PHOTOPRINTING
Original Filed Jan. 10, 1930  14 Sheets-Sheet 8

Ashley G. Ogden INVENTOR
BY Wm. S. Pritchard ATTORNEY

Jan. 3, 1933.  A. G. OGDEN  1,893,439
ART OF PHOTOPRINTING
Original Filed Jan. 10, 1930  14 Sheets-Sheet 9
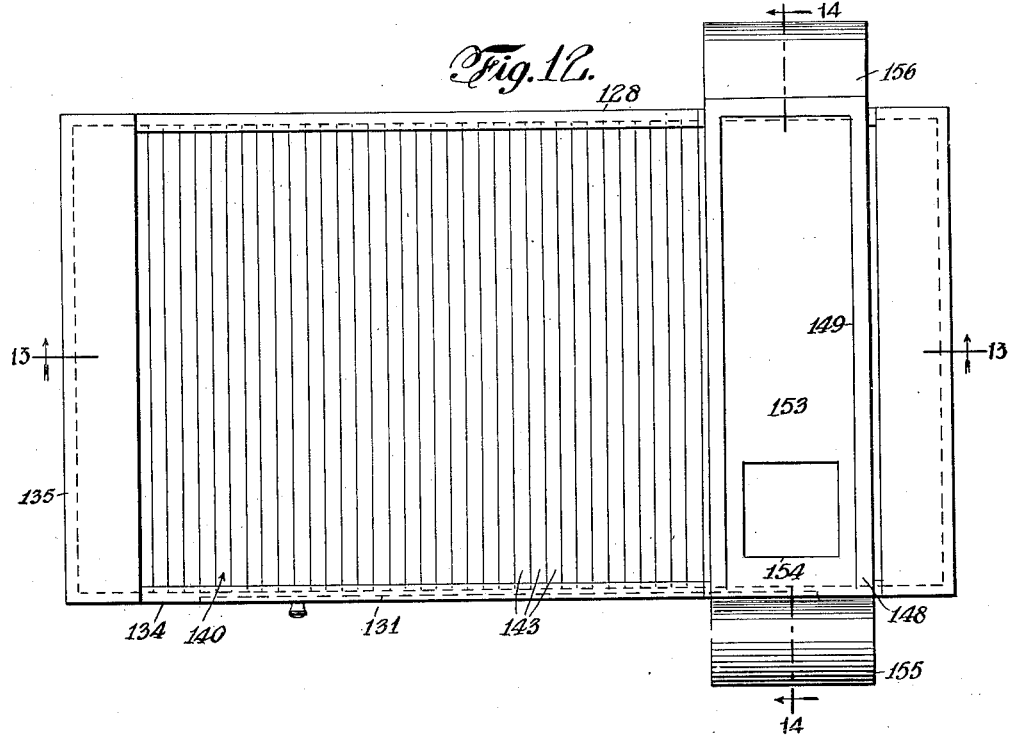
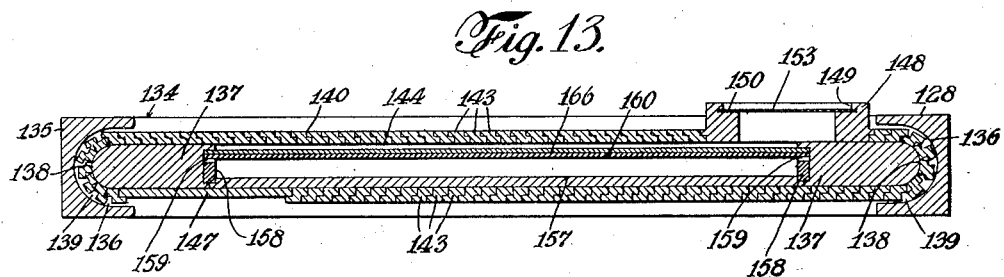
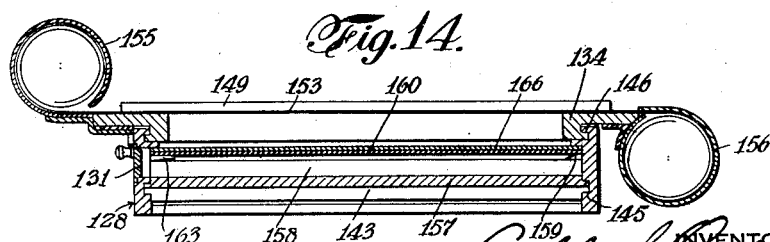

Jan. 3, 1933.  A. G. OGDEN  1,893,439
ART OF PHOTOPRINTING
Original Filed Jan. 10, 1930  14 Sheets-Sheet 10
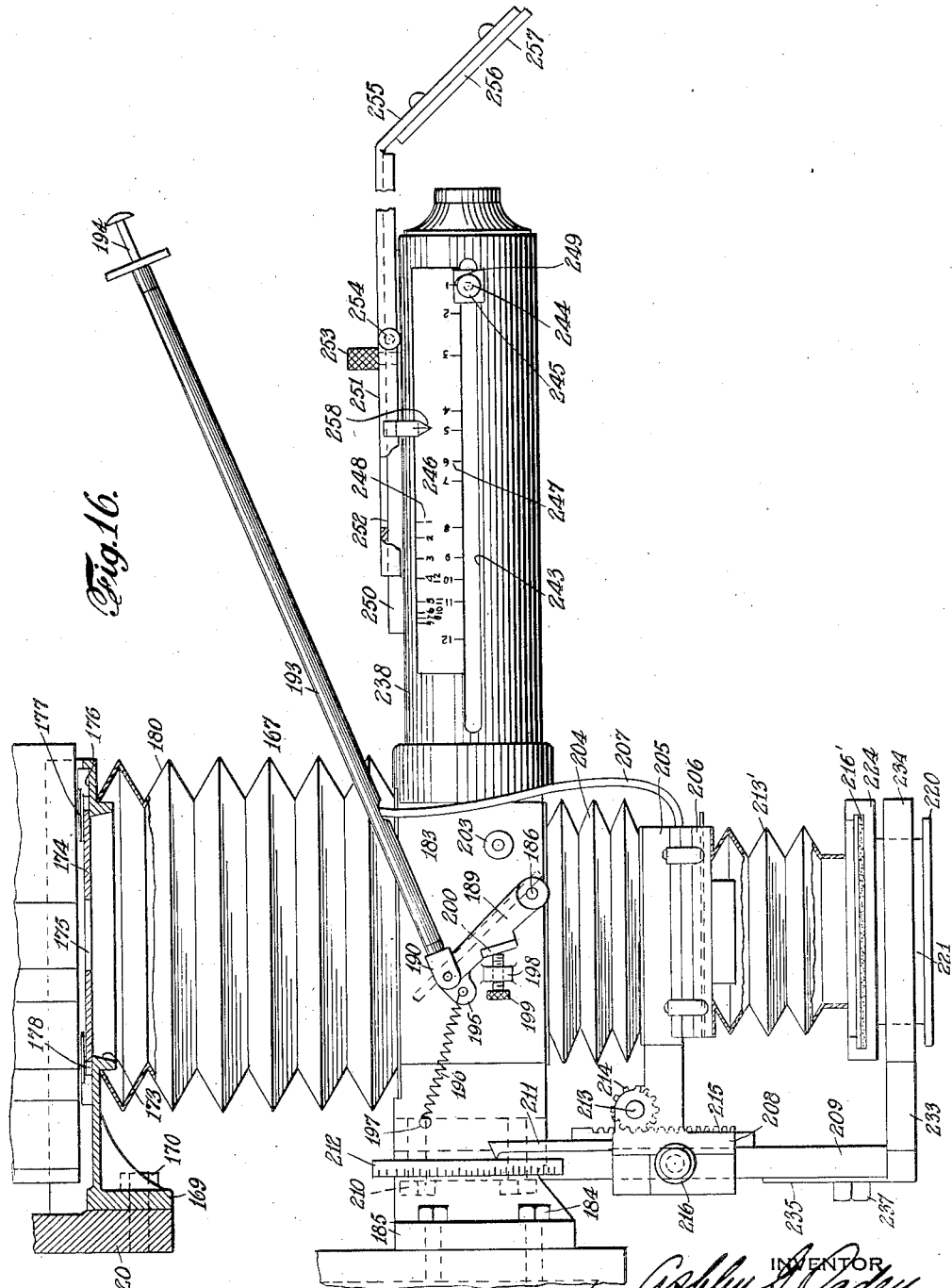
Fig.16.
INVENTOR
Ashley G. Ogden
BY
Wm. S. Pritchard
ATTORNEY Jan. 3, 1933. A. G. OGDEN 1,893,439
ART OF PHOTOPRINTING
Original Filed Jan. 10, 1930 14 Sheets-Sheet 11
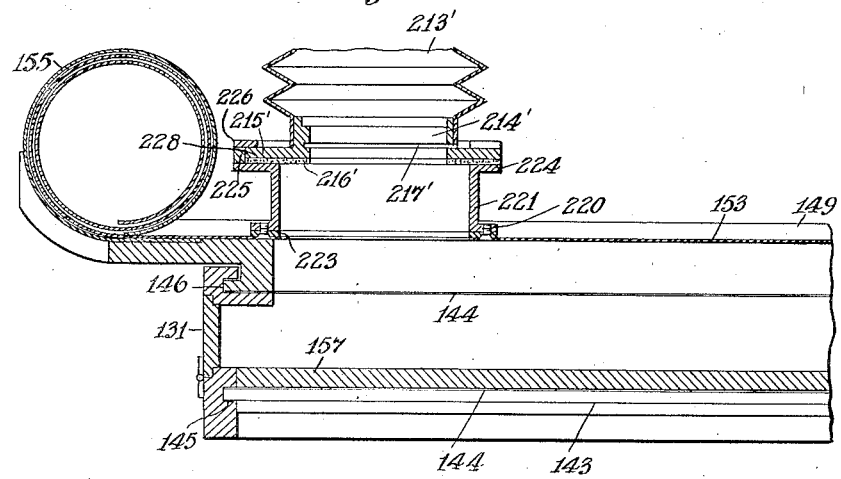
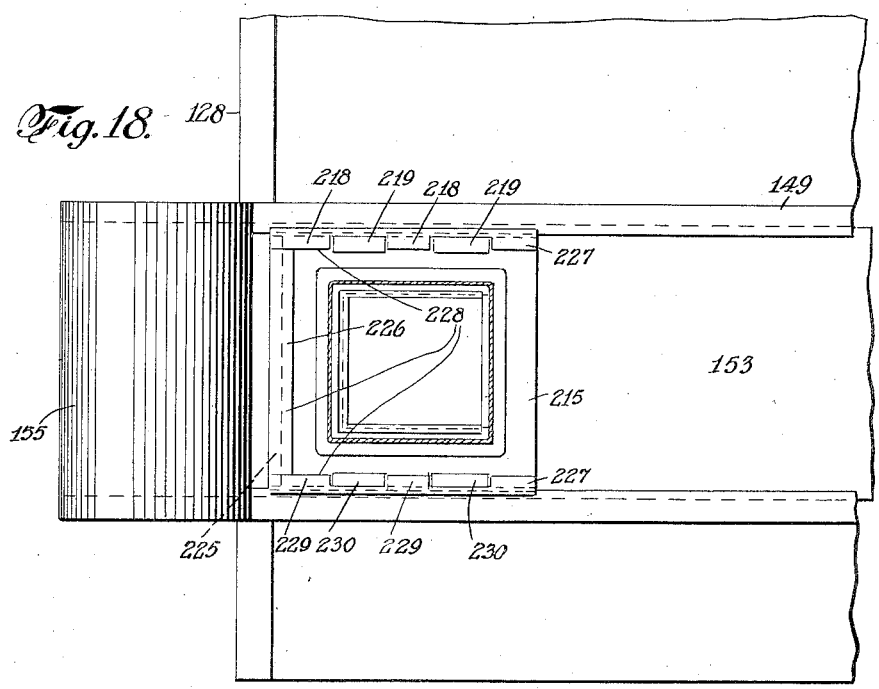

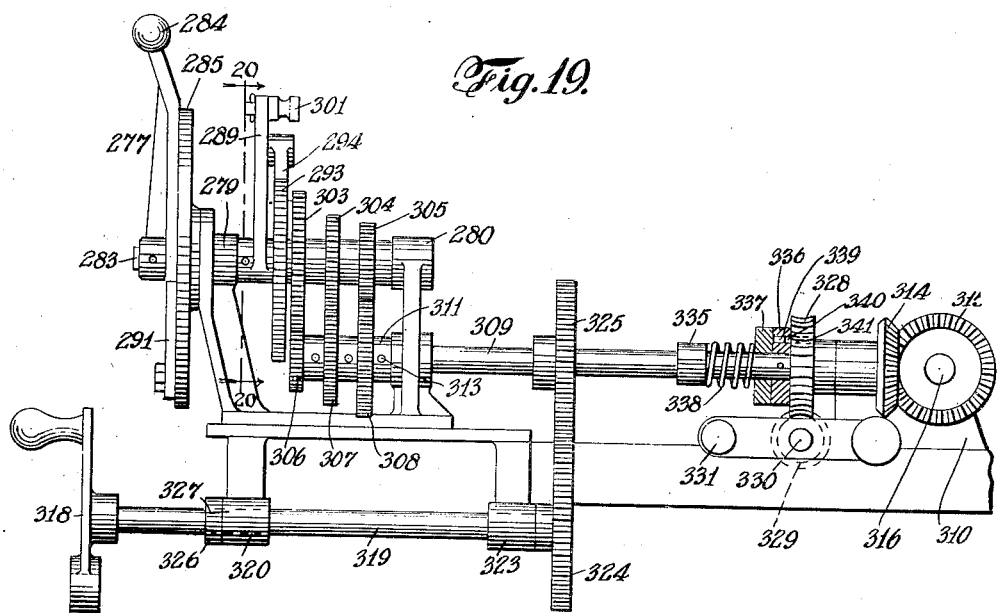
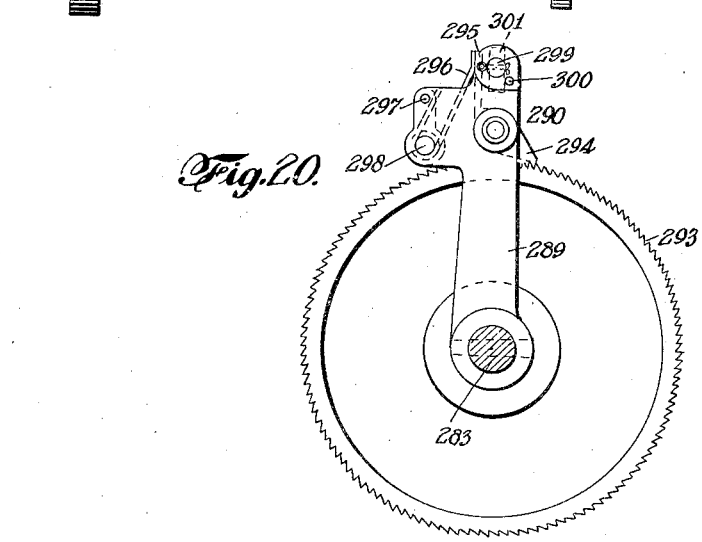

Jan. 3, 1933.  A. G. OGDEN  1,893,439
ART OF PHOTOPRINTING
Original Filed Jan. 10, 1930    14 Sheets-Sheet 13
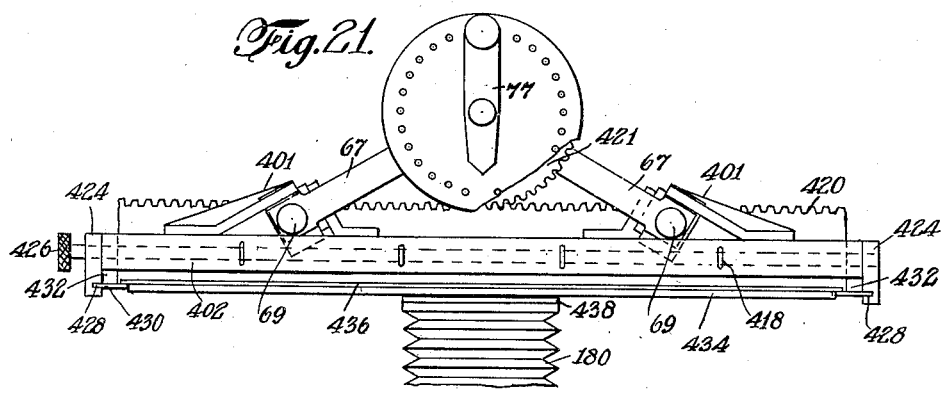
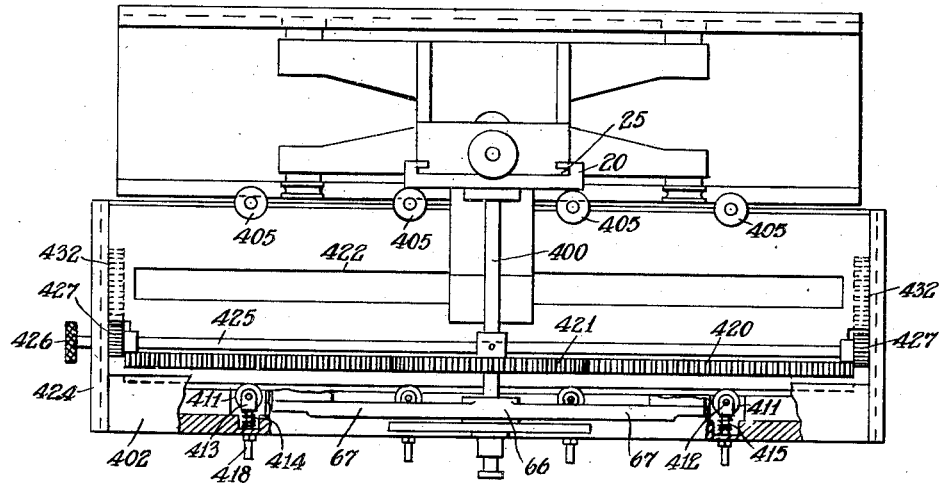
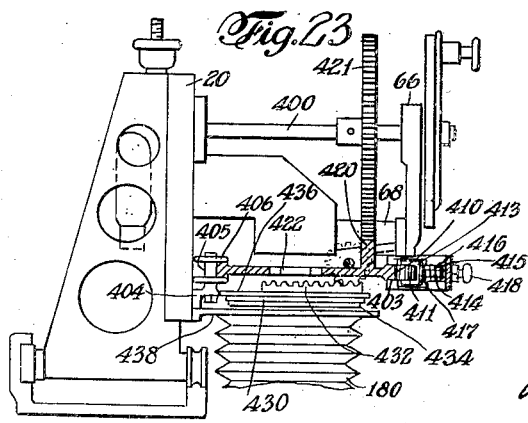

Jan. 3, 1933.  A. G. OGDEN  1,893,439
ART OF PHOTOPRINTING
Original Filed Jan. 10, 1930   14 Sheets-Sheet 14
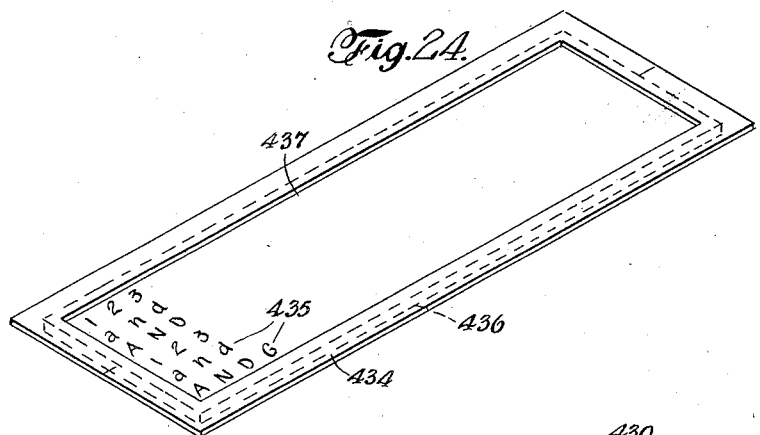
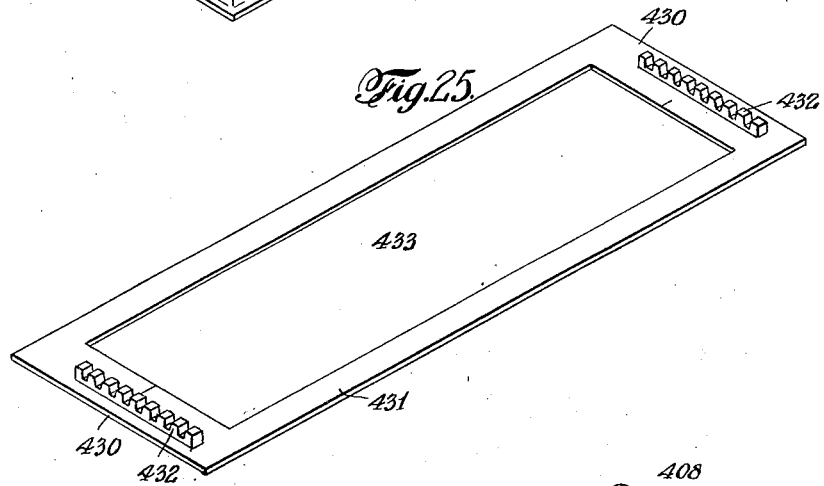
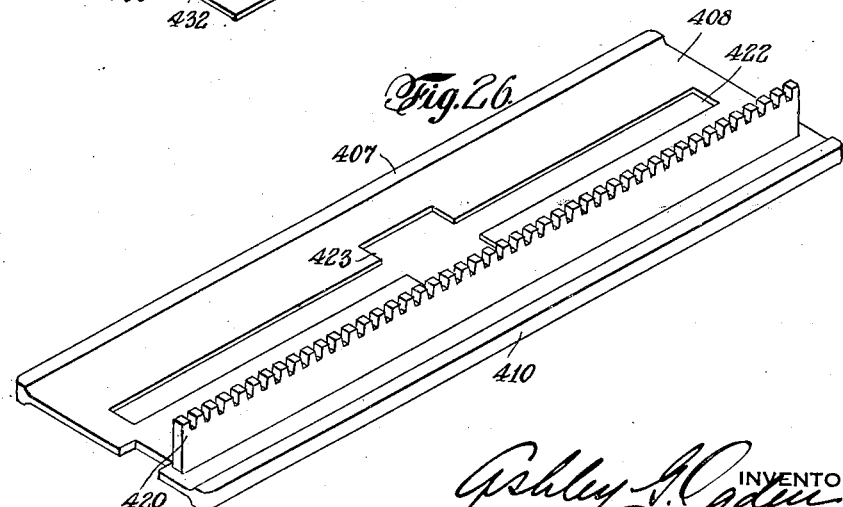
Ashley G. Ogden INVENTOR
BY Wm. S. Pritchard
ATTORNEY Patented Jan. 3, 1933

1,893,439

UNITED STATES PATENT OFFICE

ASHLEY G. OGDEN, OF BALTIMORE, MARYLAND, ASSIGNOR TO GENERAL PRINTING INK CORPORATION, OF NEW YORK, N. Y., A CORPORATION OF DELAWARE

ART OF PHOTOPRINTING

Application filed January 10, 1930, Serial No. 419,775. Renewed March 19, 1932.

This invention relates to printing, and more particularly to an improvement in the art of photographic compositions.

The invention provides a photoprinting machine which selectively exposes to view images of successive portions of a matter to be composed and which is also adapted to photographically fix corresponding successive images upon a sensitized surface.

The invention further provides a device which will project upon a predetermined portion of a layout surface in selected spaced relationship images of successive elements of a composition and which will photographically fix a succession of similar images upon a corresponding portion of a sensitized surface in accordance with said spaced relationship.

The invention still further provides a simple and efficient machine which is flexible enough to be adapted to the production of a variety of fanciful and selective compositions.

The invention also contemplates a device which will effect from a single sized master character any selective degree of photographic enlargement or reduction within a predetermined range.

According to a concrete exemplification of the present invention, an unrelated series of master characters are assembled on a single bearing member. This member is associated with a character selector having indicia designated thereon corresponding to the master characters. A layout table is provided which is adapted to have projected thereon images of selected characters in response to the actuation of said character selector. A photographic lens system and a sensitized surface are provided and are so arranged with respect to said character bearing member, that the selection of a particular indicia brings the corresponding character into the axial range of said lens system for reproduction upon said sensitized surface.

Means are also provided whereby the image of any character may be selectively projected either upon the layout table or upon the sensitized surface. This layout table can be relatively translated with respect to the master character to permit the projection on said table of successive images in predetermined spaced relationship. This relative translation is also imparted to the sensitized surface so as to successively expose distinct portions of said surface in accordance with said predetermined spaced relationship.

In order to effect selective degrees of enlargement and reduction in photographic imprints, means are provided for adjusting various elements of the device in accordance with predetermined scales.

The invention also consists in certain new and original features of construction and combinations of parts hereinafter set forth and claimed.

This application is a continuation in part of my prior application S. N. 148,367, filed Nov. 15, 1926.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof in which:

Figure 1 is a front elevation of a concrete embodiment of the invention.

Figure 2 is a side elevation of the same.

Figure 3 is a top plan view of the same.

Figure 3a is a section taken on line 3a—3a of Figure 3.

Figure 4 is a sectional side elevation of the same.

Figure 5 is a section taken on line 5—5 of Figure 4.

Figure 6 is a plan view of the character-bearing drum.

Figure 7 is an elevation of the character-bearing drum.

Figure 8 is a plan view of the band which carries the characters.

Figure 9 is a view of another band similar to Figure 8.

Figure 12 is a top plan view of the lightproof casing.

Figure 13 is a section taken on line 13—13 of Figure 12.

Figure 14 is a section taken on line 14—14 of Figure 12.

Figure 16 shows details of the camera unit and the various reflecting means associated therewith.

Figure 17 is a sectional elevation showing details of connection between the camera unit and the lightproof casing.

Figure 18 is a top plan view showing details of the connection between the camera unit and the lightproof casing.

Figure 19 is a side elevation showing details of the spacing selector unit.

Figure 20 is a section taken on line 20—20 of Figure 19.

Figure 21 is a front elevation partly in section of a modified form of character bearing unit.

Figure 22 shows a top plan view of the modified form of character bearing unit shown in Figure 21.

Figure 23 is a side elevation partly in section of the modified form of character bearing unit shown in Figure 21.

Figure 24 is a perspective showing a negative glass plate with developed characters thereon used in the modified form of character bearing unit shown in Figure 21.

Figure 25 is a perspective showing in detail a support for the negative glass plate indicated in Figure 23.

Figure 26 is a perspective of a sliding carriage unit used in the modified form of character bearing unit shown in Figure 21.

Like reference characters denote like parts in the several figures of the drawings.

Figure 10:
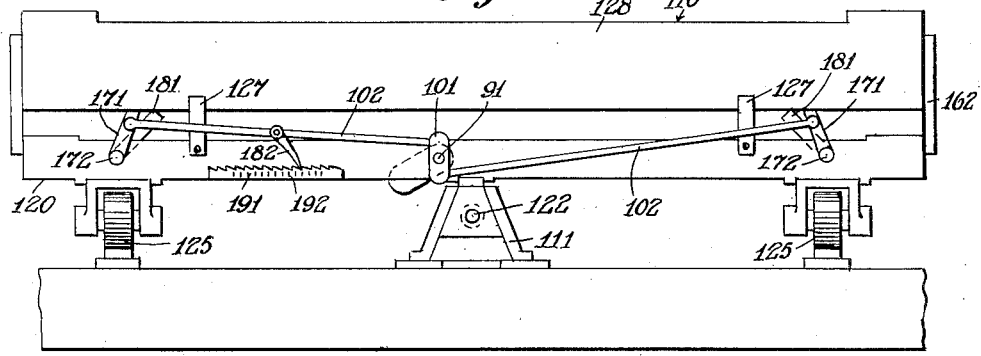
Figure 10 is a rear elevation of the sensitized film carriage and lightproof casing.

In the following description and in the claims, parts will be identified by specific means for convenience but they are intended to be as generic in their application to similar parts as the art will permit.

Referring particularly to the drawings, the invention is shown as constituted by an organization which is mounted on a frame structure comprising legs 1, tie rods 2 and panels 3 (Figures 1, 2 and 4). This frame structure is surmounted by a bed plate 4 which is constructed to permit the travel of a carriage unit 5 therealong. For this purpose the bed plate 4 is provided with a pair of tracks constituted by a channel 6 and a rail flange 7 having a longitudinal triangular edge.

The carriage unit 5 (Figure 4) comprises a frame structure 8 having secured thereto a bracket 9 upon which is mounted a socket 10. This socket 10 receives a lamp 13 and has also secured thereto a reflector 14.

Rotatably mounted with respect to the carriage unit 5 on suitable axles are rollers 11 and 12. The rollers 11 ride along the channel 6 and the rollers 12 have V-grooved peripheries which correspond to the triangular edge of the rail flange 7, so as to permit riding engagement therewith.

Extending through the top of the frame structure 8 is a bore 21 having mounted therein a flanged bushing 15 which is secured to the frame structure 8 by means of lag bolts 16 (Figure 2). A hand wheel 17 (Figure 4) is mounted in said bushing 15 and has passing therethrough a threaded spindle 18. Secured to one end of said spindle 18 is a member 19 which is affixed to a channel plate 20 by means of bolts 23 and screws 24. The frame structure 8 (Figure 2) has integral therewith flanges 25 which are embraced by the channel plate 20, so that said plate is guided vertically therealong in response to the actuation of the hand wheel 17. This channel plate 20 has also secured thereto a pointer 21' which cooperates with a scale 22 mounted on the side of the frame structure 8 (Figure 1). The significance of this scale will be hereinafter discussed.

Secured to the channel plate 20 (Figure 4) by means of bolts 27 is a flanged sleeve 28 upon which is mounted the character-bearing unit 29. This unit 29 comprises a drum 30 having upon its periphery three rows of equally spaced perforations 33 (Figures 6 and 7). The drum is also provided with large apertures 34 and 35 for the purpose hereinafter referred to. Slots 36 and 37 are provided in diametrically opposed relationship on the periphery of the drum 30 for the retention therein of the ends of flexible character bands 38. These bands 38 are preferably made of phosphor bronze and are provided with three rows of apertures 41 which register with the apertures 33 on the drum. The ends of these bands are angled at 39 to conform with the corners of the slots 36 and 37. These angled ends are locked in place in said slots 36 and 37 by means of screws 40 having segmental heads.

The bronze bands 38 have engraved thereon transverse registration lines 43 and longitudinal registration lines 44, these lines being equidistantly positioned from the center of their respective apertures 41 (Figures 8 and 9). Secured to these bands 38 are master characters represented by plates 45 having opaque surfaces, except those portions thereof which contain the characters to be projected or printed on the sensitized surface hereinafter referred to. These plates 45 may be secured to said bands 38 by any suitable means, preferably by cement, and may be of any proper material, such as celluloid having a developed film or negative of collodium or other suitable sensitized substance thereon.

Associated on both sides of the letter designated on the plates 45 are spacing marks 46 and 47, base lines 48 and spacing index numbers 49, the significance of which will be later set forth. These spacing marks 46 and 47, base marks 48 and index numbers 49 are impressed upon the plates 45 by scratching the developed part of the plates and coating the scratched portion with transparent color filter, such as red ink. The spacing marks 46 and base lines 48 on the plates 45 are aligned in registered positions with the registration lines 43 and 44 respectively. The marks 47, however, will be spaced from the center of their respective apertures 41 in accordance with the characteristics of the letter designated thereon as will be subsequently described.

The drum 30 has integral therewith a hub 50 which is provided with a keyway 53 (Figure 5). Passing through the hub 50 and the flanged sleeve 28 is a shaft 54 having a keyway 55 which registers with the corresponding keyway 53. Fitted in both keyways 53 and 55 is a sunk key 56 which maintains a fixed relative position between the shaft 54 and the hub 50 by means of a plate 57 biased against the side of the keyway 53 through the agency of a plurality of springs 58 positioned in a slot 59.

The shaft 54 is journaled at one end in the flanged sleeve 28 and has circumferentially mounted at this end a race member 60 which is secured thereto by means of a plate 63 (Figure 4). This race member 60 has a ball-bearing engagement with a companion race member 64 secured to the flanged sleeve 28. Roller bearings 65 are also mounted between the shaft 54 and the flanged sleeve 28.

The other end of the shaft 54 is journaled in a flanged bearing 66 which is integral with a pair of radially extending supports 67 and which is associated with the shaft 54 through a ball-bearing arrangement 70. These supports 67 are secured to one end of a pair of horizontal arms 68 by means of hand screws 69 (Figures 1 and 2). The other ends of these arms are suitably connected to the channel plate 20 for vertical movement therewith.

Mounted at the end of the shaft 54 is a character selector unit 71. This unit comprises a dial 73 secured to the flange of the bearing 66 by means of pins 74. This dial 73 is provided with a plurality of apertures 75 circumferentially arranged (Figure 1). Each of said apertures 75 corresponds to a particular character on the bands 38 and has disposed adjacent thereto indicia 76 which designate three particular characters.

Cooperating with the dial 73 is a pointer 77. Affixed to this pointer 77 is a nut 87 which is provided with a diametrically extending bore 88. One end of the pointer 77 is provided with a stepped bore 78 (Figure 4). Passing therethrough is a spindle 79 having a knob 80 at one end and also a collar 83 intermediately positioned so as to normally cooperate with an annular shoulder 84 in the bore 78. An apertured plate 85 is mounted across the entrance to the bore 78 in which is disposed a coil spring 86 to normally urge the end of the spindle 79 into cooperative engagement with any selected aperture 75 in accordance with the dialing of any desired character.

The rotation of the drum 30 in response to the dialing of a selected character is effected through the agency of a spindle 89. This spindle is provided at one end with a knob 90 and is affixed to the pointer 77 by means of a tapered pin 93 extending through the bore 88 and one of three holes 94 along said spindle. These holes 94 are spaced along the spindle 89 in accordance with the transverse space between the rows of apertures 33 in the drum.

The shaft 54 is provided with an axial bore 95 for the reception of the spindle 89. This shaft 54 is also provided with a slot 96 which acts as a guideway for a pin 97 passing through aligned radial holes 98 and 99 in the hub 50 and the end of the spindle 89 respectively.

To translate the drum 30 into any one of three selective positions along the shaft 54, the pin 93 is withdrawn and the spindle 89 pulled out through the manipulation of the knob 90, so as to register the selected one of the three holes 94 with the bore 88. The spindle 89 through its cooperation with the pin 97 draws the drum along the shaft 54. The pin 93 is then replaced to lock the spindle 89 in the selected place.

To rotate the drum 30 into any selective positions, the knob 80 is pulled out and the pointer 77 rotated. The rotation of this pointer is imparted to the drum 30 through the agency of the spindle 89 and the cooperating pin 97. The drum can be locked into position by releasing the knob 80 and permitting the spindle 79 connected therewith to engage in any selected aperture 75.

Mounted inside the drum 30 is a light chute 103 comprising a horizontal section 109 disposed in the direct path of the rays emitted from the lamp 13, and also a vertical section 110 adapted to guide rays through the selected apertures 33 of the drum (Figure 4). This chute is secured to the sleeve 28 by means of brackets 104, which are held together by bolts 105 and which are provided with flanges 106 (Figures 4 and 5). Secured to the sides of the chute 103 are brackets 107 which cooperate with the flanges 106 through the agency of bolts 108, so as to provide a suitable means of supporting said chute.

Between the sections 109 and 110 of the chute 103 is disposed a reflecting plate 113 which is adapted to vertically divert the rays through the condensing lens system 114 mounted in said section 110 (Figure 4). This section 110 is suitably reinforced by means of angle irons 115 welded to each of its sides.

Mounted underneath the bed plate 4 is a shelf 117 (Figures 1 and 2). This shelf 117 is provided with a plurality of rail supports 118 upon which are mounted a pair of rail members 119.

Riding on these rail members 119 is a sensitized film carriage unit 116. This unit comprises a main casting 120 which is provided with four pairs of depending brackets 123 spaced in quadrilateral relationship. Each of said pairs of brackets has journaled therethrough axles 124 on which are mounted rollers 125 adapted to ride on the rails 119.

Depending from the bottom of the main casting 120 (Figure 1) is a bush 121 which engages a feed screw 122 journaled in a bracket 100. This bush travels between two guide plates 111 secured to the shelf 117 (Figure 10).

The end of the feed screw 122 terminates in a crank handle 132, the manipulation of which effects the translation of the carriage unit 116 along the rails 119. To designate the amount of translation of said carriage unit 116 along the rails 119, the bracket 100 has secured thereto a collar 141 having a mark 142 on the surface thereof which indicatively cooperates with a calibrated micrometer dial 151 set on said feed screw 122 (Figure 3).

Figure 11:
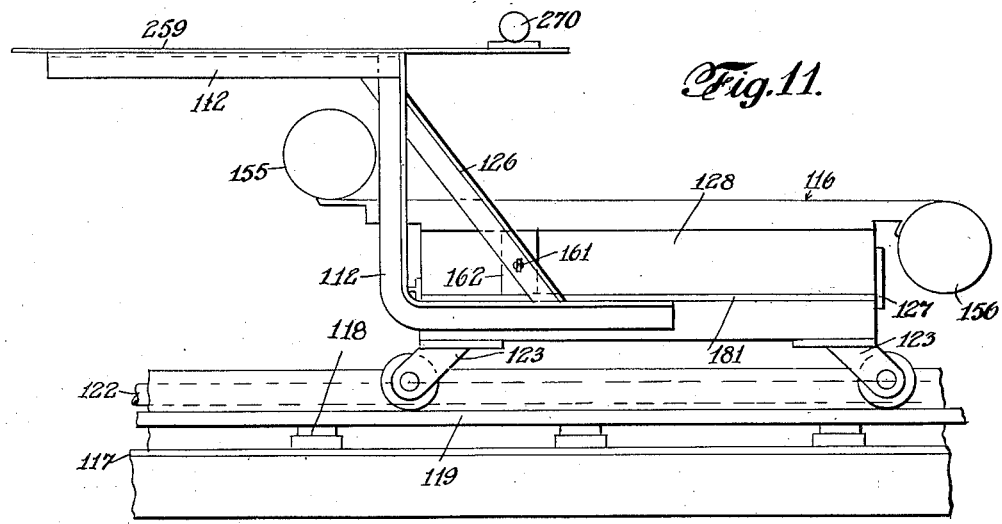
Figure 11 is a side elevation of an assemblage similar to that of Figure 10.

Secured to the sides of the main casting 120 are angle pieces 112 having angle braces 126 welded thereon (Figure 11). Also secured to this casting 120 at the rear thereof are detent lugs 127. Positioned between said angle braces 126 is a removable lightproof casing 128, the rear portion of which abuts the detent lugs 127. Said casing 128 is provided with a hinged closure member 131 to permit access to the interior thereof (Figure 1).

To hold the casing 128 in place the front portion of the casting 120 has pivotally mounted thereon a pair of arms 129 which are provided therethrough with finger screws 130 adapted to impinge on the bearing plates 133 secured to the front of said casing. For a similar purpose the angle brace 126 disposed on the right side of the casing 128 is provided therethrough with a finger screw 161 adapted to impinge on a bearing plate 162 secured to the side of said casing.

Extending through the casting 120 is a spindle 91 having a handle 92 at one end and a lever arm 101 secured at the other end (Figures 1, 10 and 11). At the ends of this lever arm 101 are pivotally mounted a pair of links 102, the other ends of which are similarly connected to arms 171. These arms 171 are secured to spindles 172 journaled in the front and rear portion of the casting 120. Secured to the spindles 172 between the said front and rear portions of the casting 120 are plate members 181. It should be noted that by means of this arrangement the casing 128 can be elevated vertically through the action of the plate members 181 in response to the actuation of the handle 92. The amount of elevation can be predetermined by means of a pawl 182 pivotally mounted on one of the links 102. This pawl 182 cooperates with a rack 191 which is secured to the casting 120 and which has mounted thereon a scale 192.

Figures 12, 13 and 14 show details of the casing 128, which comprises a frame structure 134, the end members 135 of which are provided with circular channels 136. Mounted on the frame structure 134 are blocks 137 having circular edges 138. These edges 138 are concentrically mounted adjacent the channels 136 and spaced therefrom so as to define circular passageways 139. These passageways serve as guides for a flexible rolling cover 140. This cover consists of a plurality of slats 143 attached to a strip of canvas 144 and linked together as shown in Figure 13. This cover arrangement is mounted in track grooves 145 and 146 provided in the frame structure 134 as shown in Figure 14. The bottom section of the cover 140 includes a strip 147, the position of which as shown defines the end of the travel of said cover. The top section of the cover has a member 148 with an opening 149 on each side of which is provided ledges 150. Guided along these ledges is a substantially flexible curtain 153 preferably made of phosphor bronze and provided with a square aperture 154 which constitutes a means of access to the interior of the casing 128.

The ends of this curtain 153 are coiled up in cylindrical cases 155 and 156 which are mounted on the member 148. It should be observed that, as the curtain 153 is translated along the ledges 150, one end thereof will coil up in one casing while the other end unwinds itself in the other.

Figure 15:
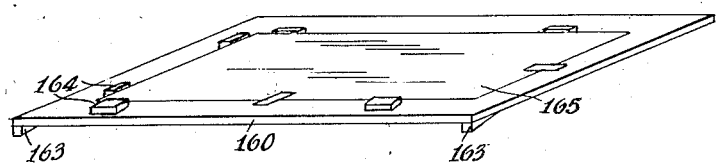
Figure 15 is a perspective of the sensitized film holder.

The interior of the casing 128 is provided with a shelf 157 on the sides of which are mounted slats 158. On one end of these slats are secured wedges 159 which support a sensitized film holder in the form of a metal plate 160. This plate is integrally provided at the bottom with wedges 163 which are similar to the wedges 159 and which are supported by slats 158 (Figure 15). The top face of the metal plate 160 has integral therewith lugs 164 which serve as guides for the location of a sensitized film 165. Disposed over this sensitized film is a plate glass 166 which is mounted over the plate 160 and sensitized film 165 (Figures 13 and 14). This assemblage is positioned in the casing 128 by sliding it through the opening adjacent the hinged closure 131.

Disposed between the casing 128 and the drum 30 is a camera unit 167 (Figs. 4 and 16). This camera unit comprises a casting 169 secured to the channel plate 20 by means of bolts 170. The top portion of said casting 169 is positioned proximate to the periphery of the drum 30 and is generally shaped to conform to the circular periphery of said drum. This casting 169 is provided with an opening 173 to permit the passage of light rays therethrough. However, the amount of light rays passing through this opening is restricted by a detachable slide 174 having a square aperture 175 and positioned over the opening 173. This slide is held in place between the base 176 of the casting 169 and lugs 177 which are integrally secured to one side of said casting. The slide 174 is also positioned between the lugs 178 which are integrally connected to the base 176 of the casting 169. This slide 174 is slipped into position, as shown, through a cut-away portion 179 (Figure 2) of said casting 169. If desired, a screen may be placed over the top surface of the slide 174 in order to produce shaded effects in the letters as will be more apparent hereinafter. The distance between the base 176 and the lugs 177 permit the positioning therebetween of such a screen.

Cemented or otherwise secured to the casting 169 is one end of a bellows 180, the other end of which is similarly secured to a mirror housing 183. This housing is secured to the frame structure 8 of the carriage unit 5 by means of bolts 184 passing through flange portions 185 of said housing.

Journaled to the sides of said housing 183 is a rock shaft 186 upon which is fixed a plate 187 having a mirror 188 secured thereto (Figure 4). The rock shaft 186 extends beyond the outside of the housing 183 and has pinned to the extending portion thereof an arm 189, the free end of which is pivotally connected to a bifurcated member 190 (Figure 16). This member 190 is connected to one end of a tube 193, the other end of which terminates in a conventional plunger arrangement 194 adapted to actuate a photographic shutter hereinafter referred to.

The free end of the arm 189 is integrally provided with a lug 195 which is connected to one end of a spring 196, the other end of which is secured to a pin 197 in the frame structure of the housing 183. Mounted on the outside of said housing 183 is a bracket 198 which has passing therethrough a thumb screw 199 adapted to impinge on a bearing plate 200 on the arm 189. This thumb screw serves to adjust the angular position of the arm 189 and the corresponding position of the mirror 188. It should be noted that the mirror 188 is positioned in the path of the rays passing through the bellows 180. This mirror can, however, be positioned outside the range of these rays by pulling the tubing 193 against the action of a spring 196. The amount of angular travel of this mirror 188 during this operation is determined, however, by a detent 203 secured to the side of the housing 183.

Secured to the under side of the housing 183 is one end of a second bellows 204, the other end of which is secured to a frame member 205 upon which is mounted a conventional photographic lens system (not shown) and a suitable automatic shutter arrangement 206, the details of which are eliminated for the sake of simplicity. This shutter arrangement 206 is actuated in response to the actuation of the plunger arrangement 194, the tubular member 193 being connected for that purpose to the shutter 206 through a flexible tubing 207.

The frame structure 205 is connected to a slider 208 which is arranged to travel along a member 209 secured to the frame structure of the housing 183 by means of bolts 210. Journaled to the side of the slider 208 is a shaft 213 upon which is mounted a toothed wheel 214. This toothed wheel 214 meshes with a rack 215 secured to the member 209. Passing through the slider 208 is a hand-locking screw 216, the end of which impinges on said member 209. By this arrangement the slider 208 can be moved along the member 209 and fixed in any selective position by means of locking screw 216. This determines the corresponding selective position of the photographic lens system. To establish this photographic lens system in a predetermined position, a pointer 211 is provided which is secured to the slider 208 and which indicatively cooperates with a scale 212 mounted on the frame structure of the housing 183. The significance of this scale 212 will be more fully disclosed hereinafter.

The under side of the frame structure 205 is connected to one side of a third bellows 213', the other side of which is secured to a member 214' (Figures 17 and 18). This member 214' has flanges 215' on the under side of which is adhesively secured a layer of plush 216'. The member 214' is also provided with a slot 217' for the reception of a light shutter (not shown). The flanges 215' are alternately provided with projections 218 and notches 219. The member 214' rests on a sleeve member 221 having a bottom flange 220 which is conjointly secured to a gasket 223 and curtain 153. The sleeve 221 is also provided with a top flange 224 to which is secured by suitable means around three edges thereof spacing strips 225. To the top of said strips is connected an end strip 226 and a pair of side strips 227 (Figure 18). The strips 227 are provided alternately with projections 229 and notches 230 which correspond to the projections 218 and notches 219 of the flanges 215' respectively. All of the strips 226 and 227 conjointly define with spacing strips 225 and flange 224 channels 228. These channels receive three edges of the flanges 215' as shown in Figure 18.

In assembling the bellows 213' to the curtain 153, the projections 218 on the flanges 215' are passed through corresponding notches 230 of the strips 227 and then slipped into place (shown in Figure 18), so that each of the projections 218 is disposed underneath the corresponding projections 229.

The sleeve member 221 is maintained in alignment with the photographic axis of the camera by means of a yoke 233 having a pair of prongs 234 which embrace the outside of said sleeve member (Figures 4 and 16). This yoke has secured thereto a vertical arm 235 which is provided with a slot 236. This slot 236 has passing therethrough a bolt 237 having a threaded engagement with the guide member 209. The vertical position of said prongs can be selectively adjusted by sliding said slot (236) along said bolt (237) and tightening said bolt in the desired position.

Secured to the housing 183 is a tubular casing 238 which is mounted in axial alignment with the axis of the rays reflected by the mirror 188 (Figure 16). Telescopically mounted inside said tubular casing is a slidable member 239 upon which is mounted a lens system 240 (Figure 4). This tubular casing 238 is provided with a pair of aligned slots 243 extending longitudinally thereof and adapted as a guide for the travel of two screws 244 having threaded engagement with the slidable member 239 (Figure 16). The screws 244 are provided with caps 245, the annular edges of which are adapted to impinge on the side of the casing 238, so as to lock the lens system 240 in any selective position. Adjacent one of the slots 243 is a scale 246 having two sets of graduations 247 and 248 designated thereon, the significance of which will hereafter be described. The slidable member 239 has a mark 249 secured thereto which is adapted to indicate on the scale 247.

Secured to the top of the casing 238 is a guide rail 250. Positioned over said guide rail is a channel member 251 which is provided with a slot 252 extending longitudinally thereof. Passing through said slot is a capped screw 253 having a threaded engagement with the guide rail 250. The side of said channel member 251 has a threaded engagement with a cap screw 254, the end of which impinges upon the side of the guide rail 250 and serves to lock said channel member in selected positions. The channel member 251 is also provided with a pointer 258 adapted to indicate on the scale 248.

The end of the channel 251 is provided with an angular extension 255 which has secured thereto a plate 256 having a reflecting surface 257. This plate is disposed at an angle of 45° with the axis of the casing 238 and is adapted to reflect the rays impinging thereon upon a layout table 259.

The layout table 259 is positioned in the same plane with a guide plate 260 and is slidably mounted in a guideway 263 provided therein (Figure 3). This layout table 259 rests on rail members 264 secured to the under side of the guide plate 260 and is adapted to slide therealong. For the purpose of effecting this sliding operation, there is mounted on the layout table 259 brackets 265 in which is journaled a spindle 266, the longitudinal movement of which is obviated through the agency of collars 267 pinned on to said spindle. These brackets 265 are provided with flanges 268 which cooperate in overlapping relationship with racks 269 as shown in Figure 3A. In this manner the possibility of shifting the plane of the layout table 259 with respect to the plane of the guide plate 260 is obviated.

The spindle 266 has also secured thereto two pinions 271 which mesh respectively with racks 269 mounted on the guide plate 260. The spindle 266 is rotated through the manipulation of a knob 270 secured at one terminus of said spindle. The rotation of this spindle effects the corresponding travel of said layout table with respect to the guide plate 260. The plate 260 is secured to the horizontal portions of the angle pieces 112, so that transverse movement of said plate is effected concomitantly with the travel of the carriage unit 116 along the rails 119.

The layout table 259 is provided with lugs 273 which serve as guide members for the positioning of a layout sheet 274. The location of these lugs 273 corresponds to the location of the lugs 164 in the metal plate 160 and are relatively positioned in vertical plane alignment therewith. This layout table is also provided with an engraved marking 275 which indicatively cooperates with a scale 276 on the guide plate 260. The significance of this scale 276 will hereinafter be described.

In order to project light rays on predetermined portions of the layout sheet 274 and to effect predetermined spacing between successive projections on said sheet, a spacing unit 277 is provided (Figures 1, 2, 3, 19 and 20). This unit comprises a base plate 278 which is secured to the frame structure of the device and which has mounted thereon two spaced bearing brackets 279 and 280. Journaled in these two brackets is a shaft 283 having fixed at one end thereof a spacer lever 284 which cooperates with a space selector dial 285 mounted on the bracket 279. This selector dial is provided with a plurality of rows of holes 286 concentrically arranged with respect to the axis of the shaft 283. A top row 287 has thirty holes equally spaced along an arc of 30°. The second row 288 has thirty holes equally spaced along an arc of 60° and the other rows contain an equal number of holes on an arc which progressively increases by 30° as the center of the axis of the shaft 283 is approached. Loosely mounted on this shaft 283 is a lever 291 which can be locked in any selected position with respect to the space selector dial 285 by means of a clip 292.

Pinned to the shaft 283 (Figure 20) is an arm 289, at the free end of which is disposed a pawl arrangement 290 which cooperates with a ratchet 293. This pawl arrangement 290 comprises a pawl 294 pivotally mounted on the arm 289 and having a lug 295 integral therewith which engages one end of a spring 296. The other end of the spring 296 engages a detent 297 and the intermediate portion is coiled around a pin 298 secured to said arm 289. Rotatably mounted on said arm 289 is a pin 299 which is axially maintained in place by means of a cotter pin 300 passing through one end thereof. The other end of said pin 300 terminates in a latch 301. When the latch is positioned as shown in Figure 20, the pawl 294 is in cooperative relationship with the ratchet 293 under the influence of the spring 296. However, if it is desired to disengage this pawl 294 from the ratchet 293, the latch 301 is turned so as to abut the lug 295 and rotate the same in counterclockwise direction. This will effect a corresponding counterclockwise rotation of the pawl 294 with a resultant disengagement of said pawl from the ratchet 293.

The ratchet 293 is loosely mounted on the shaft 283 and has fixed thereto a gear 303. The shaft 283 has also loosely mounted thereon gears 304 and 305 which are suitably secured to the hub of the gear 303, so that all of the gears rotate in unison. The gears 303, 304 and 305 are progressively stepped down in size and mesh with three overhung gears 306, 307 and 308 respectively. These gears 306, 307 and 308 are loosely mounted on a shaft 309 which is journaled in the bracket 280 near one end thereof and an angular bracket 310 proximate the other end (Figure 3). These gears are provided with hubs 311 having radial holes 313 therethrough adapted to register with corresponding radial holes in the shaft 309 (Figure 19). In this manner a selective speed ratio can be effected between the shaft 283 and the shaft 309 by pinning the desired gear in place.

The shaft 309 is provided with an overhung bevel gear 314 which meshes with a second bevel gear 315 secured in overhung relationship to a feed screw 316. This feed screw is journaled at one end in the angular bracket 310 and has a threaded engagement with a bush 317 on the frame structure 8 of the carriage unit 5 (Figure 3). It should be observed that the angular displacement of the spacer lever 284 effects a corresponding rotation of the feed screw 316 and a relative movement of the carriage 5 along the rails 6 and 7. A movement of the carriage 5 can also be effected through the actuation of a crank handle 318 fixed to the end of a shaft 319 which is journaled in brackets 320 and 323. The other end of the shaft 319 has fixedly mounted thereon overhung spur gears 324 which mesh with a spur gear 325 secured to the shaft 309. The shaft 319 is also provided with a graduated dial 326 which cooperates with an engraved mark 327 on the bracket 320.

In order to effect a micrometric movement of the carriage unit 5, when desired, the shaft 309 is provided with a loosely mounted worm wheel 328 which meshes with a worm 329 fixed to a suitably journaled shaft 330. The end of this shaft terminates in a crank handle 331 and has mounted thereon a micrometric dial 332 having graduations which cooperate with an engraved mark (not shown) on a fixed bearing collar (not shown). Fixed to the shaft 309 are collars 335 and 336 (Figure 19). Disposed between said collars is a third collar 337 which is loosely mounted on the shaft 309 and which is urged towards the collar 336 through the action of a coil spring 338. The collar 337 has connected thereto a projecting pin 339 which at suitable times passes through the holes 340 and 341 provided in the collar 336 and worm wheel 328 respectively. In this manner the carriage unit 5 can be moved micrometrically in response to the actuation of the crank handle 331.

Suppose in the operation of the machine it is desired to photographically print the word Patent in letters six-tenths of an inch in height. The hand wheel 17 is turned so as to move the channel plate 20 with its associated drum 30 along the flanges 25 until the pointer 21' registers with that number on the scale 22 which corresponds to a letter six-tenths of an inch high. If the scale 22 is calibrated to indicate letters in tenths of an inch, the hand wheel 17 will be turned until the pointer 21' registers on number "6" of said scale. The position of the photographic lens is correspondingly adjusted in accordance with the desired height of the letter by manipulating the locking screw 216 until the pointer 211 registers with the number "6" on the scale 212; the lens system 240 is shifted along the tubular casing 238 until the mark 249 registers with the number "6" on the scale 247. The channel member 251 is shifted along the guide rail 250 until the pointer 258 registers with number "6" on the scale 248 and the layout table 259 is translated with respect to the guide plate 260 through the manipulation of the knob 270, until the engraved marking 275 registers with the number "6" on the scale 276. In this manner all the elements of the machine will be optically adjusted to project on the layout table 259 and sensitized film 165 a focused image six-tenths of an inch in height.

It should be noted that the distance from the lens system 240 to its focal plane varies in accordance with the degree of enlargement or reduction of the image desired. However, inasmuch as the position of the focal plane constituted by the layout table 259 remains constant, the desired focal distance between the lens system 240 and the layout table 259 is effected through the shifting of the channel member 251 along the guide rail 250. This, it should be noted, will project the image on portions of the layout sheet 274 which vary in accordance with the degree of enlargement or reduction of the image. However, successive images regardless of any such degree of enlargement or reduction will be projected on the sensitized sheet 165 in center line alignment. Therefore, in order to effect the projection of the image on that portion of the layout sheet 274 corresponding to the projectable position of the image on the sensitized sheet 165, the scale 276 and cooperating mark 275 have been provided (Figure 3). The scale 276 is so calibrated and the mark 275 so set with respect thereto that, regardless of the degree of enlargement or reduction of the image desired, the image will always be projected on that portion of the layout sheet 274 which corresponds to the projectable position of the image on the sensitized sheet 165.

It should be observed that each of the apertures 75 has indicia 76 associated therewith comprising three designations in triangular spaced relationship. One designation corresponds to the first row of characters 45 on the bands 38 and represents the capital letters; another designation corresponds to the second row of characters on the bands and represents lower case letters; and the third designation represents figures and the like. The particular row of characters desired is positioned within the planar range of the photographic axis by shifting the drum 30 along the shaft 54 through the manipulation of the spindle 89 and locking the drum in the selected place as herein before described.

The letter "P" is then dialed through the positioning of the pointer 77 in designated relationship with respect to said letter on the dial 73. This operation will effect rotation of the drum 30 with its associated master characters so as to bring the particular plate 45 which carries the letter "P" into axial range of the photographic lens system. The light from the incandescent lamp 13 which is reflected from the surface of the plate 113 through the condensing lens system 114 will shine through only that part of the plates 45 covered by the character or letter and no light will pass through the opaque portions thereof. The slide 174 serves to confine the field of the projected light rays to a single character. The image of the letter "P" will be reflected from the mirror 188 through the lens system 240 where it is inverted and projected on to the reflecting surface 257 and diverted thereby upon the layout table 259 in an upright position. It should be noted that the image of the letter "P" is projectable upon that part of the sensitized film 165 corresponding to that portion of the layout table upon which the image is projected. However, if it is desired to select a particular part of the sensitized sheet 165 upon which to start lettering, the crank handle 132 (Figure 1) is manipulated so as to effect the transverse movement of the layout table 259 in unison with the sensitized sheet 165, until the image is reflected upon the desired transverse portion of said layout table. This operation will be effected while the mark 275 registers with that part of the scale 276 corresponding to the degree of enlargement or reduction of the image desired. It should be noted that during the transverse movement of the sensitized sheet 165 the camera unit 167 remains stationary, while the curtain 153 will slide transversely so as to bring into axial range of the photographic lens a selected transverse portion of said sensitized sheet 165 corresponding to the location of the image on the layout sheet 274.

To bring a selected longitudinal section of the sensitized sheet within axial range of the photographic lens, the crank handle 318 is manipulated. This effects a longitudinal movement of the carriage unit 5 along the rails 6 and 7, until the image of the letter "P" is reflected upon the desired longitudinal portion of the layout sheet 274. During this operation the sensitized film 165 remains stationary but the camera unit 167 travels longitudinally with respect therewith. However, through the agency of the flexible rolling cover 140, this movement is permitted so as to bring into axial range of the photographic lens a selected longitudinal section of the sensitized sheet corresponding to the location of the image on the layout sheet 274.

The image of the letter "P" will be projected upon the layout sheet 274 with the image of the spacing marks 46 and 47 shown in red. The image of the letter will also have associated in red underneath thereof index spacing numbers 49.

The width of the alphabet is keyed in thirtieths so that the index spacing numbers 49 indicated underneath each character designate the number of thirtieths that each character should be moved, when made in combinations with other letters in order to give proper artistic spacing.

The location of the spacing marks 46 and 47 on both sides of the letter "P" are recorded upon the layout sheet 274. The tubing 193 is pulled so as to angularly displace the mirror 188 outside the range of the light rays passing through the camera. The plunger arrangement 194 is then manipulated to actuate the photographic shutter 206, so that the image of the letter "P" will be inverted by the photographic lens and imprinted upon the sensitized sheet 165. This photographic shutter 206 has means associated therewith for automatically effecting equal degrees of exposures for successive imprints. The shutter arrangement also has attached thereto means for selectively adjusting the amount and degree of exposure.

It should be noted that spacing marks 46 and 47 and the index numbers 49 are projected in red and will not print on the sensitized sheet. It should also be noted that the image photographically fixed on the sensitized sheet will be an exact duplication of the image on the layout sheet. The tubing 193 is then released to permit the mirror 188 to be restored to its normal reflecting position under the action of the spring 196.

The next character to be dialed is the letter "A". This letter will be reflected on the layout sheet in superimposed relationship with the previous image "P" with the right hand spacing mark 46 of the letter "A" as shown on the layout sheet 274 in line with the recorded right hand mark of the previous image "P". It should be noted from Figure 9 that the index number of the letter "A" is thirty-six and the letter "A" is properly spaced from the previous image "P" through the operation of the space lever 284, in accordance with said thirty-six index spacing units.

If desired, after the image of the letter P has been projected on the layout table and its position is recorded, the image of the letter "A" is then projected and the table moved so that the right hand spacing mark 46 of the letter "P" is in alignment with the left hand spacing mark 47.

As previously discussed, the first row of spacing indications 287 on the spacer dial 285 contain thirty holes of equal division along an arc of 30°. The machine is so geared that, when the lever 284 is advanced the full 30°, it will move the carriage unit 5 one and one-half tenths of an inch. The first row of holes 287 will be used for letters one and one-half tenths of an inch in height. The second row of indications 288 on the dial 285 contains thirty equally spaced holes arranged on an arc of 60°. The second row corresponds to a letter three-tenths of an inch in height and the advancement of the lever 284 along the full length of this row will move the carriage unit 5 three-tenths of an inch. In a similar manner the other rows of holes correspond to letters of different heights in accordance with the length of the arc. Different combinations are obtained by the three sets of gears 306, 307 and 308, as hereinbefore discussed.

For a letter "A" six-tenths of an inch high the spacer lever 284 is advanced a full 120°. This effects the advance of the carriage unit 5 six-tenths of an inch through the cooperation of the pawl 294 and the ratchet 293. The spacer lever 284 is restored to its original position and again advanced an additional six holes along a 120° arc, so as to effect the advance of the carriage the full thirty-six units as designated by the index number 49 on the layout table. This will bring the image of the left hand spacing mark 47 of the letter "A" as projected upon the layout sheet 274 in register with the recorded right hand spacing mark 46 of the previous image "P". As previously discussed, the manipulation of the spacer lever 284 will expose corresponding successive portions of the sensitized sheet 165 to the image of the letter "A".

If he desires, the operator may space by hand through the manipulation of the crank handle 318 instead of using the spacer dial 285. In that case the operator will turn his crank handle 318 until the image of the left hand spacing mark 47 of the letter "A" registers on the layout sheet with the right hand recorded spacing mark 46 of the previous image of the letter "P". The other letters of the word Patent are similarly imprinted on the sensitized sheet 165.

Suppose it is desired to photographically print the word Patent with the latter "P" six-tenths of an inch high and the remaining letters reduced to three-tenths of an inch high, all of the letters to be positioned on the same base line 48. The letter "P" will be printed as already described. The hand wheel 17 is then manipulated until the pointer 21' indicates on the number "3" of the scale 22. The position of the photographic lens will be correspondingly adjusted as well as the lens system 240 and the reflecting plate 256. The letter "A" is dialed and the image thereof will be properly focused on the layout sheet 274 because of the adjustments already described. This image on the layout sheet 274 will be displaced from the base line of the image of the previous letter "P". However, the image of the letter "A" that would be projectable upon the sensitized film 165 would be reduced equally on both ends from the center line thereof, so that the bottom of the image of the letter would be displaced from the base line of the imprint of the letter "P". It should be noted, however, that regardless of the amount of reduction or enlargement of the various letters, the image thereof will always be projected in center line alignment upon the sensitized sheet 165. To bring the image of the letter "A" on the same base line of the image of the letter "P", the knob 270 is manipulated so as to transversely translate the layout table 259 until the mark 275 registers with the number "3" on the scale 276. This scale, as already discussed, is so calibrated that this operation brings the image of the letter "A" in center line alignment with the previous image of the letter "P" on the layout sheet 274. The image of the letter "A" on this layout sheet is then in a position corresponding to the projectable position of the image of the letter "A" on the sensitized film. The image of the letter on the layout sheet is then brought upon the base line of the previous image through the manipulation of the crank handle 132. This effects the corresponding change in the projectable position of the image upon the sensitized film, so as to bring the image of the base line of the letter "A" in register with the previous position of the base line of the image of the letter "P".

In case it is desired to print a fanciful design or the like, a negative thereof may be positioned in the casting 169 in place of the slide 174. In that case it may be necessary in accordance with the size of the design to project a beam of light therethrough having a greater cross-sectional area. For this purpose enlarged apertures 34 and 35 are provided in the periphery of the drum 30. These apertures can be selectively positioned within the range of the photographic lens as hereinbefore described with reference to the selection of the individual letters.

It should be noted that the photographic lense and the lens system 240 are similar. It is desirable, however, to have the lens system 240 of a focal length which is greater than that of the photographic lens. The advantage of such diversity in focal lengths of the respective lens systems is manifest. By providing the photographic lens having a comparative small focal length, economy in vertical space is effected. However, by providing the lens system 240 with greater focal length, the tubular casing 238 can be mounted at a greater distance from the layout sheet 274 so as to effect thereby greater working range.

The various scales hereinbefore referred to are optically calibrated to effect focused images of predetermined sizes. These calibrations can be effected by any manner well known in the art. It may be desired, however, in order to economize in vertical spacing to limit the range of the scale 22 associated with the drum 30. However, this limitation does not extend to the other scales. If it is desired, therefore, to print an image having a size beyond the range of the scale 22, the drum 30 will be disposed in its lowermost position on the scale and the deficiency thereof compensated by elevating the casing 128 through the manipulation of the handle 92, as already described, until the pawl 182 indicates on the scale 192 the selected size of the image.

Figures 21 to 26 inclusive show a modified form of character-bearing unit. In accordance with this modified form there is journaled to the channel plate 20 one end of a shaft 400, the other end of which is journaled in the flanged bearing 66. The supports 67 extending radially from said flanged bearing 66 have mounted on the ends thereof support brackets 401. These supports 67 are secured to one end of a pair of horizontal arms 68 by means of hand screws 69, as already described with reference to Figures 1 and 2. The other ends of these arms are suitably connected to the channel plate 20 for vertical movement therewith.

Secured to the support brackets 401 is a horizontal bearing box 402 which is provided with a horizontally extending slit 403. This slit 403 serves as a guide bearing as will be more apparent hereinafter. Secured to the channel plate 20 is a bracket 404 which has vertically mounted thereon four bearing rollers 405. These rollers are provided with horizontal flanges 406 between which is disposed one bearing edge 407 of a sliding carriage 408 (see Figures 23 and 26). This sliding carriage 408 is also provided with a bearing edge 410 which has a sliding contact in the slit 403. Abutting the edge 410 of the sliding carriage 408 are four rollers 411 mounted on spindles 412, the ends of which are pivotally connected to yokes 413. These yokes 413 have stems 414 extending therefrom which are encircled by coil springs 415 disposed in bores 416. These springs cooperate with washers 417 mounted on the stems 414 to urge said rollers 411 into contact with the edge 410 of the carriage 408. The degree of contact between these rollers and the edge 410 of the sliding carriage 408 can be adjusted through the agency of thumb-adjusting screws 418.

The sliding carriage 408, as shown in Figure 26, is provided with a longitudinally extending rack 420 which meshes with a spur gear 421 pinned to the shaft 400. This sliding carriage 408 is also provided with a longitudinally extending slit 422, the central portion of which is abruptly enlarged to define an opening 423. This enlarged opening 423 serves the same purpose as the apertures 34 and 35 of the drum 30 in Figure 7.

Mounted adjacent both ends of the carriage 408 are brackets 424 through which is journaled a horizontal spindle 425. This spindle terminates at one end in a knurled knob 426 and has pinned proximate each end thereof gears 427.

The brackets 424 are provided with guide grooves 428 in which are slidably disposed edges 430 of a character support member 431 (see Figure 25). This support member 431 is provided at each end with racks 432 which mesh with the gears 427. This member 431 is also provided with an opening 433 in which is disposed a negative glass plate 434 having a plurality of characters 435 photographically developed thereon. Each of these characters has associated therewith spacing marks similar to those shown in Figures 8 and 9.

The glass plate 434 is glued on or otherwise secured to the under side of a frame piece 436 and is exposed to view through an opening 437 in said frame piece. Secured to the channel plate 20 underneath said glass plate 434 is a member 438 which is provided with a suitable opening (not shown) and which has secured underneath thereof the bellows 180.

In the operation of this modified form of the character-bearing unit, any longitudinal row of characters may be selectively brought into alignment with the slit 422 by means of the manipulation of the knurled knob 426. This effects the translation of the character support member 431 along the guide grooves 428 independently of the carriage 408 until the selected row of characters has been brought into range of the slit 422. Means may be provided for locking said support member 431 into any selective position with respect to the sliding carriage 408 so as to correspond to the desired longitudinal row of characters. After the particular longitudinal row of characters has been brought into alignment with the slit 422, the particular character desired may be brought into axial range of the photographic lens system through the manipulation of the pointer 77. The rotation of this pointer 77 is imparted to the gear 421 which in turn causes the translation of the sliding carriage 408 between the rollers 405 and 411. It should be noted that this sliding carriage travels in unison with the negative plate 434 so that any character can be selectively brought within the range of the photographic lens to be printed. The possibility of lost motion in the sliding carriage 408 is obviated through the agency of the rollers 411 and their associated spring-adjusting means.

It should be noted that through the agency of the present invention a simple and inexpensive set of master characters can be utilized from which any selected degree of photographic enlargement or reduction within predetermined ranges can be produced. It should also be observed that by means of a plurality of such sets of master characters having different styles of letters designated thereon, a great variety of fanciful and selective compositions can be effected at very little cost.

With respect to the appended claims, it is to be understood that expressions such as "master character" and "master" are generically descriptive of letters, designs, or other representations, the images of which are to be formed on the recording medium. Further, it is to be understood that the term "photo-lettering machine" is generically descriptive of machines which produce images of true letters and also of machines which produce images of the aforesaid designs or representations on the recording medium. Still further, it is to be understood that the terms "sensitized film", "recording medium", and "sensitized medium" are generically descriptive of light-sensitive plates, films, surfaces, or the like.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

I claim:

1. The improvement in the art of preparing compositions, which comprises selectively visually exposing images of successively selected master characters, and photographically fixing upon a recording medium images corresponding with the respective visually exposed images.

2. The improvement in the art of preparing lettering compositions, which comprises selectively visually exposing upon a layout surface images of successively selected master characters, and photographically fixing upon a sensitized sheet images corresponding with the respective visually exposed images.

3. The improvement in the art of preparing compositions, which comprises selectively visually exposing to view images of successively selected master characters, and photographically fixing upon a recording medium images of said master characters similar to the visually exposed images.

4. The improvement in the art of preparing compositions, which comprises selectively visually exposing upon a layout surface the images of successively selected master characters, and photographically fixing upon a recording medium images of said master characters similar to the visually exposed images.

5. The improvement in the art of preparing compositions for printing, which comprises selectively visually exposing in predetermined spaced relationship upon a layout surface the images of successively selected master characters, and photographically fixing other images of said master characters upon a recording medium in accordance with said predetermined spaced relationship.

6. The improvement in the art of preparing compositions for printing, which comprises selectively visually exposing in predetermined spaced relationship upon a layout table the images of successively selected master characters, and photographically fixing images similar to those exposed upon the layout surface upon a recording medium in accordance with said predetermined spaced relationship.

7. The improvements in the art of preparing compositions for printing, which comprises selectively visually exposing upon a predetermined section of a layout surface the images of successively selected master characters, and photographically fixing upon a corresponding section of a recording medium other images of said master characters.

8. The improvement in the art of preparing compositions for printing, which comprises selectively visually exposing upon a predetermined section of a layout surface the images of successively selected master characters, and photographically fixing upon a corresponding section of a recording medium images similar to the visually exposed images.

9. The improvement in the art of preparing compositions for printing, which comprises alternately visually exposing images of successively selected master characters and photographically fixing images corresponding with the respective visually exposed images.

10. The improvement in the art of preparing compositions for printing, which comprises alternately projecting in view the images of successively selected master characters and projecting images similar to the visually exposed images on to a sensitized medium.

11. The improvement in the art of preparing compositions for printing, which comprises first exposing to view the images of successively selected master characters, and then photographically fixing images corresponding with the respective visually exposed images.

12. The improvement in the art of preparing compositions, which comprises alternately visually exposing in predetermined spaced relationship the images of successively selected master characters and photographically fixing images corresponding with the respective visually exposed images in accordance with said spaced relationship.

13. The improvement in the art of preparing compositions, which comprises first visually exposing in predetermined relationship the images of successively selected master characters, and then photographically fixing images similar to the visually exposed images in accordance with said spaced relationship.

14. The improvement in the art of preparing compositions for printing, which comprises alternately visually exposing the images of successively selected master characters in accordance with spacing marks associated therewith and photographically fixing other images of said selected master characters in accordance with said spacing marks.

15. The improvement in the art of preparing compositions for printing, which comprises alternately visually exposing the images of successively selected master characters, said master characters and images having spacing marks associated therewith, whereby a proper spaced relationship is obtained, and photographically fixing other images of said master characters in proper spaced relationship without the spacing marks.

16. The improvement in the art of preparing compositions for printing, which comprises alternately visually exposing the images of successively selected master characters in spaced relationship in accordance with marks formed of a non-photographic material and associated with said master characters and photographicaly fixing other images of said master characters without the spacing marks.

17. The improvement in the art of preparing compositions for printing, which comprises visually exposing the image of a selected master character together with spacing marks associated therewith, photographically fixing another image of said master character without the spacing marks, visually exposing the image of another selected master character with its associated spacing marks, positioning the image of the successive master character relative to the preceding image by virtue of the spacing marks, and photographically fixing other images of the successive selected master characters in the adjusted position without the spacing marks.

18. The improvement in the art of preparing compositions for printing, which comprises visually exposing an image of a master character upon a layout surface, adjusting said layout surface to position the image upon a selected portion of the layout surface, positioning a sensitized medium, and photographically fixing another image of said master character in proper position on said sensitized medium.

19. The improvement in the art of preparing compositions for printing, which comprises visually exposing an image of a selected master character, photographically fixing another image of said master character, visually exposing an image of another selected master character, said second image being reduced in size relative to the first image, positioning said second image relative to the base line of the composition, and photographically fixing another image of the second selected master character in its proper position.

20. The improvement in the art of preparing compositions for printing, which comprises visually exposing an image of a selected master character, photographically fixing another image of said character, visually exposing a reduced image of another selected master character, positioning the reduced image relative to the first image and the base line of the composition, and photographically fixing another image of the second selected character in proper position.

21. The improvement in the art of preparing compositions for printing, which comprises visually exposing an image of a selected master character, photographically fixing another image of said master character, visually exposing an image of a second selected master character, said image being of a different size than the first image, positioning said second image relative to the base line of the first image, and photographically fixing another image of the second master character in proper position.

22. The improvement in the art of preparing compositions for printing, which comprises visually exposing an image of a selected master character, photographically fixing another image of said master character on a sensitized medium, visually exposing an image of a second selected master character on said layout surface, the last mentioned image being of a different size than the first visually exposed image, adjusting the position of the layout surface so that the second exposed image is properly positioned relative to the base line of the first image, adjusting the position of the sensitized medium, and photographically fixing another image of the second master character in proper position on the sensitized medium.

23. The improvement in the art of preparing compositions for printing, which comprises projecting an image of a selected master character upon a layout surface, recording the position of said image on said layout surface, photographically fixing another image of said master character, projecting an image of a second selected master character onto said layout surface, bringing said second image into selective positional relationship with said first recorded image, and photographically fixing another image of the second master character in proper position relative to the image already photographically fixed.

24. The improvement in the art of preparing compositions for printing, which comprises projecting an image of a selected master character upon a layout surface, recording the position of said image upon said layout surface, photographically fixing another image of said master character on a sensitized medium, projecting an image of a second selected master character onto said layout surface, adjusting the position of said second image relative to the first image both on the layout surface and on the sensitized medium, and photographically fixing an image of the second master character in proper position.

25. A machine for preparing photographic compositions for printing comprising a master having a plurality of characters, and means to selectively project images of selected characters to view and onto a sensitized medium.

26. A machine for preparing photographic compositions for printing comprising a master having a plurality of characters, and means to alternately expose to view and photograph images of selected characters.

27. A photoprinting machine comprising a plurality of master characters, and means to selectively project an image of any selected master character to view and onto a sensitized medium.

28. A photoprinting machine comprising a plurality of master characters, means for visually exposing an image of any selected character, and means to impress another image of said selected character upon a recording medium.

29. A photoprinting machine comprising a plurality of master characters, means for exposing to view an image of any selected character, and means to impress an image similar to the visually exposed image on a recording medium.

30. A photoprinting machine comprising a plurality of master characters, a layout table mounted for visual observation, and means for selectively projecting an image of any selected master character upon a recording medium and upon the layout table.

31. A machine for preparing photographic compositions for printing comprising a plurality of master characters, means to project to view an image of a selected character, and means to project an image of said selected character onto a sensitized medium.

32. A machine for preparing photographic compositions for printing comprising a plurality of master characters, means to selectively position any of said characters for reproduction, means to visually expose an image of the selected character, and means to photograph an image of the selected character on a sensitized medium.

33. A machine for preparing photographic compositions for printing comprising a plurality of master characters, means to selectively position any of the characters for reproduction, a layout table mounted for visual observation, means to project the images of the selected characters on said layout table and sensitized medium, and means to properly position the images on both the layout table and sensitized medium.

34. A machine for preparing photographic compositions for printing comprising a plurality of master characters, means to selectively position any of said characters for reproduction, a layout table mounted for visual observation, means to project the images of the selected characters on said table, means to project images of said selected characters on a sensitized medium, means to adjust the surface of said table to provide proper positioning of the images thereon, and means to adjust said sensitized medium to provide proper positioning of the images thereon.

35. A machine for preparing photographic compositions for printing comprising a plurality of master characters, means to selectively position any of said characters for reproduction, a layout table mounted for visual observation, means to project the images of the selected characters on said table, means to project images of said selected characters on a sensitized medium, means to adjust said table to provide proper positioning of the images thereon, and means to adjust said sensitized medium to provide proper positioning of the images thereon, both of the adjusting means operating in unison.

36. A machine for preparing photographic compositions for printing comprising a plurality of master characters, means to selectively position any of said characters for reproduction, a layout table mounted for visual observation, and a plurality of projection systems, one to project an image of the selected character on said layout table and the other to project an image of the selected character on a sensitized medium.

37. A machine for preparing photographic compositions for printing comprising a plurality of master characters, means to selectively position any of said characters for reproduction, a layout table mounted for visual observation and having an adjustable layout surface, and a plurality of projection systems, one to project an image of the selected character on said layout surface and the other to project an image of the selected character on a sensitized medium.

38. A machine for preparing photographic compositions for printing comprising a plurality of master characters, means to selectively position any of said characters for reproduction, a layout table mounted for visual observation, a holder for carrying a sensitized film, a plurality of projection systems, one to project an image of the selected character on said layout table and the other to project an image of the selected character on said sensitized film, means to move said table to secure proper positioning of the image thereon, and means to move the sensitized film to secure proper positioning of the image thereon.

39. A machine for preparing photographic compositions for printing comprising a master having a plurality of characters, means to selectively position any of said characters for reproduction, a layout table mounted for visual observation, a holder for carrying a sensitized film, a plurality of projection systems, one to project an image of the selected character on said layout table and the other to project an image of the sensitized character on said sensitized film, means to move said table to secure proper positioning of the image thereon, and means to move the sensitized film to secure proper positioning of the image thereon, the two last named means operating in unison.

40. In a photographic lettering machine, a projecting system for projecting images of letters on a sensitized medium, an adjustable make-up table, a second projecting system for projecting images of said letters to view on said make-up table, and means for moving the sensitized medium and make-up table so that the images of the letters may be projected on said sensitized medium in proper spaced relation to each other and to the entire composition.

41. In a photo-printing machine, the combination comprising a layout surface, means for projecting successive images on to said layout surface in selective positional relationship to each other, and means for photographically fixing similar images in similar relationship on a sensitized medium.

42. In a photo-printing machine, the combination comprising a layout surface, means for projecting successive images on said layout surface in selective positional relationship to each other, means for photographically fixing similar images in similar relationship on a sensitized medium, and means for moving said sensitized medium and said layout surface.

43. In a photo-printing machine, the combination comprising a layout surface, means for projecting successive images on said layout surface in selective positional relationship to each other, means for photographically fixing similar images in similar relationship on said sensitized medium, and means for moving said sensitized medium and said layout surface in unison.

44. In a photo-lettering machine, the combination comprising a holder for carrying a sensitized film, a plurality of master characters, a layout surface, a projection system adapted to selectively project an image of a selected master character on said film and said layout surface, means for translating said surface and said holder in unison along one line of direction, and means for translating the projection system in a line of direction transverse to the line of direction of said surface and said holder.

45. In a photo-lettering machine, the combination comprising a plurality of master characters, a layout surface, a lightproof casing, a holder for carrying a sensitized film, said holder being positioned in said casing, said casing having a flexible rolling cover movable in one line of direction and an apertured curtain movable in a line of direction transverse thereto, a camera secured over the apertured portion of said curtain, means for translating said casing and said layout surface in unison, and means for selectively projecting an image of a selected character upon the layout surface and upon said film.

46. In a photo-lettering machine, the combination comprising a plurality of master characters, a layout surface, a light-proof casing having a cover movable along one line of direction and a flexible apertured curtain movable in a line of direction transverse thereto, means for coiling and uncoiling the ends of said curtain in response to the movement of said curtain, a camera secured over the apertured portion of said curtain, a holder for carrying a sensitized film in said casing, means for translating said casing and said layout surface in unison, and means for selectively projecting an image of said character on said layout surface and said film.

47. In a photo-lettering machine, the combination comprising a light-proof casing, a holder for carrying a sensitized film positioned in said casing, said casing having a flexible rolling cover movable in one line of direction, a camera associated with said movable cover, means for translating said camera along the movable line of direction of said rolling cover, whereby any selective portion of said film holder along said line of direction can be brought within the photographic range of said camera, a layout surface, means for translating said casing and said layout surface in unison, and means for selectively projecting an image of a character on said layout surface.

48. In a photo-lettering machine the combination comprising a camera, a light-proof casing secured thereto, said casing having a curtain interposed between said camera and the interior of said casing, said curtain being movable along one line of direction, a holder carrying a sensitized film positioned in said casing, means for displacing said light-proof casing along the said movable line of direction whereby any selective portion of said film holder along said line of direction can be brought within the photographic range of said camera, a layout surface, means for translating said casing and said layout surface in unison, and means for selectively projecting an image of a character on said layout surface and said film.

49. In a photo-lettering machine, the combination comprising a plurality of master characters each of which has associated therewith spacing indications formed of non-photographic material, and means for photographically printing similar successive images of said characters in positional relationship in accordance with said spacing indications.

50. In a photo-printing machine, the combination comprising a plurality of master characters each of which has associated therewith spacing indications, a layout surface, means for projecting successive images of said characters upon said surface in positional relationship in accordance with said spacing indications, and means for photographically fixing similar successive images in corresponding positional relationship.

51. In a printing machine for producing photographic compositions upon a recording medium, the combination comprising a plurality of master characters, a layout table, means for projecting the image of a selected character on said layout table, a carrier adapted to hold the recording medium, means for projecting an image of the selected character upon the recording medium, and means for translating said layout table and said carrier correspondingly.

52. In a photo-printing machine, the combination comprising a character-bearing member having a plurality of master characters associated therewith, a layout surface, a holder for carrying a sensitized film, a camera arranged to project images of a selected character onto said layout surface and said film, and means for selectively disposing any one of said characters in a projectable position with respect to said layout surface and said film.

53. A machine for preparing photographic compositions for printing comprising a plurality of master characters, means to reduce or enlarge the images of any of said characters, a layout table mounted for visual observation, and means to selectively project either the enlarged or reduced images on said layout table and on a sensitized film.

54. A machine for preparing photographic compositions for printing comprising a plurality of master characters, means to reduce or enlarge the images of said characters, a layout table mounted for visual observation, means to selectively project the enlarged or reduced images on said layout table and a sensitized film, and means to adjust the positions of said layout table and film, whereby proper positioning of the characters may be obtained.

55. A machine for preparing photographic compositions for printing comprising means having a plurality of sets of master characters, a layout table, means to selectively position any master character in projectable position, and means to selectively project images of said selected characters onto said layout table and a sensitized medium.

56. A machine for preparing photographic compositions for printing comprising means having a plurality of sets of master characters, means to position any of said sets in operative position, a layout table, means to selectively position any character of the set in operative position, and means to selectively project images of said character onto said layout table and a sensitized medium.

57. A machine for preparing photographic compositions for printing comprising a drum having a plurality of sets of master characters disposed on the periphery thereof, means to move said drum whereby any set of said master characters is brought into operative position, a layout table, means to selectively position any of the characters of the set in operative position, and means to selectively project images of the selected characters onto said layout table and a sensitized medium.

58. A photographic composing machine comprising a plurality of master characters, a layout table, means for projecting an image of a selected character in a predetermined position on said layout table, and means for projecting an image corresponding with said image upon a recording medium in a position corresponding to the predetermined position of the image on said layout table.

59. In a photoprinting machine, the combination comprising a plurality of master characters, a layout table having registrations thereon adapted as a guide for the location of a layout sheet, a plate holder having registrations thereon which correspond with the registrations on said layout table and which are adapted as a guide for the location of a recording medium, means for projecting an image of a selected character in a predetermined position on said layout table, means for projecting an image of said selected character upon a sensitized medium in the plate holder, and means for effecting proper positional relationship of the images projected on the layout table and recording medium.

60. A photographic composing machine comprising a plurality of master characters, a layout table, means for projecting an image of any selected master character upon said layout table, means for projecting an image similar to said image upon a recording medium, and means for effecting proper positional relationship of the images projected upon the layout table and recording medium.

61. In a photo-composing machine, the combination comprising a plurality of master letters having spacing indications associated therewith in accordance with the characteristics of the various letters, a layout table, means for projecting images of selected master characters and their associated indications successively upon said layout table, means for projecting images of the selected letters successively upon a recording medium, and means for exposing different portions of the recording medium to successive images in accordance with the said spacing indications.

62. In a photoprinting machine, the combination comprising a purality of master characters having spacing index numbers associated therewith in accordance with the characteristics of the characters designated thereon, a layout table, means for projecting an image of a selected master character with its associated spacing index number on said layout table, spacing selector means having graduations associated thereon in accordance with the system upon which said spacing index numbers are predicated, means responsive to the actuation of said spacing means for effecting a spaced relationship between successive images on said layout table in accordance with said spacing index numbers, and means to photographically fix other images of said selected characters.

63. In a printing machine for producing photographic compositions upon a recording medium, the combination comprising a plurality of master characters, a layout table, means for projecting an image of a selected character on said layout table, a carrier adapted to hold the recording medium, means for projecting an image similar to said image upon the recording medium, and means for translating said carrier and said layout table in unison.

64. In a printing machine for producing photographic compositions upon a recording medium, the combination comprising a plurality of master characters, a layout table, means for projecting an image of a selected character on said layout table, a carrier adapted to hold a recording medium, means for projecting an image of the selected character upon the recording medium, and means for translating said layout table independently of said carrier.

65. In a printing machine for producing photographic compositions upon a recording medium, the combination comprising a plurality of master characters, a layout table, means for projecting an image of a selected character on said layout table, a carrier adapted to hold a recording medium, means for projecting an image of the selected character upon the recording medium, means for translating said layout table independently of said carrier, and means for translating said carrier and said layout table in unison.

66. In a photoprinting machine, the combination comprising a drum having a plurality of apertures, a band having a corresponding plurality of apertures which register with the apertures on said drum, and a master character secured adjacent each of the apertures on said band.

67. An article of manufacture for use in connection with a photoprinting machine comprising a flexible band having a plurality of apertures thereon, the portions adjacent each of said apertures having indicated thereon registration marks positioned in predetermined relationship with respect to each other and adapted as a guide for the location of master characters in accordance with said predetermined relationship.

68. In a photoprinting machine, the combination comprising a drum, a band detachably secured to the periphery of said drum, and a plurality of master characters secured to said band.

69. An article of manufacture for use in connection with a photoprinting machine comprising a band having a plurality of longitudinal rows of apertures thereon, and a plurality of master characters secured adjacent said apertures and having their base lines in longitudinal alignment.

70. An article of manufacture for use in connection with a photoprinting machine comprising a band having a row of apertures thereon and a plurality of master characters secured adjacent said apertures, each of said characters having a pair of spacing marks disposed on both sides thereof and constituting justification guides, the spacing mark adjacent the right side of each letter being equally spaced.

71. In a photoprinting machine, the combination comprising a character-bearing member, a holder for carrying a sensitized film, a camera interposed between said member and said holder, a reflecting surface disposed in the photographic range of said camera, means for passing light rays through said character-bearing member, a layout surface mounted for visual observation, means for diverting rays from said reflecting surface onto the layout surface, and means for selectively displacing said reflecting surface outside the photographic range of said camera.

72. In a photoprinting machine, the combination comprising a character-bearing member having a plurality of master characters secured thereto, a holder for carrying a sensitized film, a camera interposed between said character-bearing member and said holder, means for selectively projecting an image of any selected master character through said camera, a layout surface mounted for visual observation, and means for diverting said projected image onto said layout surface.

73. In a photoprinting machine, the combination comprising a character-bearing member having a plurality of master characters secured thereto, a holder for carrying a sensitized film, a camera interposed between said character-bearing member and said holder, means for selectively projecting an image of any selected master character through said camera, means disposed in the photographic range of said camera for diverting the projected image outside the axial range of said camera, and means for selectively displacing said last-mentioned means outside the photographic range of said camera, whereby said image can be projected upon the sensitized film.

74. In a photoprinting machine, the combination comprising a layout surface mounted for visual observation, a character-bearing member having a plurality of master characters secured thereto, a holder for carrying a sensitized film, a camera interposed between said character-bearing member and said holder, means for selectively projecting an image of any selected master character through said camera, a reflecting surface pivotally mounted in the photographic range of said camera and adapted to divert said projected image onto said layout surface, and means for angularly disposing said reflecting surface outside the photographic range of said camera.

75. In a photoprinting machine, the combination comprising a layout surface mounted for visual observation, a plurality of master characters, a holder for carrying a sensitized film, a camera interposed between said characters and said holder, means for projecting an image of any selected master character through said camera, a reflecting surface disposed in the photographic range of said camera, said reflecting surface being adapted to divert the projected image towards the layout surface, and means for projecting the image upon said layout surface in predetermined sizes.

76. In a photoprinting machine, the combination comprising a layout surface mounted for visual observation, a plurality of master characters, a holder for carrying a sensitized film, a camera interposed between said master characters and said holder, means for projecting an image of a selected character through said camera, a reflecting surface disposed in the photographic range of said camera, said reflecting surface being adapted to divert the projected image towards the layout surface, means for projecting the image upon the layout surface in predetermined sizes, and means for projecting the image upon a sensitized film in a size corresponding to said predetermined size.

77. In a photoprinting machine, a combination comprising a layout table mounted for visual observation, a plurality of master characters, a holder for carrying a sensitized film, a camera unit interposed between said character and said holder, means for projecting light rays through any of said characters, a first reflecting surface interposed in the photographic range of said camera and adapted to divert the projected rays outside said range, a tubular casing axially mounted in the path of the reflected rays, a lens system mounted in said casing, a second reflecting surface positioned in the axial path of the reflected rays and adapted to project the rays upon the said layout table, means for relatively displacing any of said master characters, said lens system and said second reflecting surface being adjustable in accordance with the predetermined scale of enlargement or reduction, whereby a selected size image is projected upon the layout table, and means for projecting a similar image upon the sensitized film.

78. In a photoprinting machine, the combination comprising a layout table mounted for visual observation, a character-bearing member, a holder for carrying a sensitized film, a camera unit interposed between said character-bearing member and said holder, means for projecting light rays through said character-bearing member, a first reflecting surface interposed in the photographic range of said camera and adapted to divert the projected rays outside said range, a tubular casing axially mounted in the path of the reflected rays, a lens system mounted in said casing, a second reflecting surface positioned in the axial path of the reflected rays and adapted to project the rays upon a layout table, means for relatively displacing said character-bearing member, said lens system and said second reflecting surface being adjustable in accordance with the predetermined scale of enlargement or reduction, whereby a selected size image is projected upon the layout table, means for displacing said first reflecting surface outside the photographic range of the camera, and means for adjusting the position of the photographic lens of said camera in accordance with a predetermined scale of enlargement or reduction, whereby an image is projected upon the sensitized film holder similar to the image on the layout table.

79. A photoprinting machine comprising a plurality of master characters, a layout table mounted for visual observation, and means for selectively projecting an image of a selected character upon the layout table and a recording medium in accordance with a predetermined scale of enlargement or reduction.

80. A photoprinting machine comprising a plurality of characters, means for visually exposing an image of any one of said characters in accordance with a predetermined scale of enlargement or reduction, and means for impressing a corresponding image on a recording medium in accordance with said predetermined scale.

81. In a photo-lettering machine, the combination comprising a character-bearing member having a plurality of master characters secured thereto, each of said characters having spacing marks associated therewith, a source of light, and means whereby the rays emitted from said source have a field capable of embracing at one time but a single one of said characters with the spacing marks inside said field.

82. In a photo-lettering machine, the combination comprising a plurality of master characters, each of which has a non-printable spacing mark disposed on each side thereof constituting justification guides, a source of light, and means whereby the rays emitted from said source have a field capable of embracing at one time but a single one of said characters with the spacing marks inside said field.

83. An article of manufacture for use in a photoprinting machine comprising a band or plate having a plurality of master characters, each of said characters having adjacent thereto non-photographic spacing marks which constitute justification guides.

84. The improvement in the art of preparing compositions, which comprises selectively visually exposing images of successively selected master characters movable at will as a group in the same or opposite directions, and photographically fixing upon a recording medium images corresponding with the respective visually exposed images.

85. The improvement in the art of preparing compositions, which comprises selectively visually exposing upon a layout surface images of successively selected master characters movable at will as a group in the same or opposite directions, and, after each exposure of an image on said layout surface, photographically fixing upon a recording medium an image corresponding with the image last exposed on said layout surface.

86. The improvement in the art of preparing compositions, which comprises selectively visually exposing upon a layout surface images of successively selected master characters, and, after each exposure of an image on said layout surface, first photographically fixing upon a recording medium an image corresponding with the image last exposed on said layout surface and then moving said layout surface and recording medium to different positions, respectively.

87. The improvement in the art of preparing compositions, which comprises projecting an image of a character upon a layout surface, photographing a corresponding image upon a sensitized surface, projecting an image of a second character upon said layout surface, adjusting said surfaces bodily to bring the layout surface into position where the second image has a desired relation to the position taken by the image first projected thereon and to bring said sensitized surface to its next photographing position, and photographing an image corresponding to said second character upon the sensitized surface.

88. In a photo-lettering machine, a holder for carrying a sensitized film, a layout surface, and a projection system adapted to project an image corresponding with a selected master character on said film and on said layout surface, said holder and said layout surface being translatory in one direction, said projection system being translatory in a direction transversely of said one direction.

89. In a photo-lettering machine, a holder for carrying a sensitized film, a layout surface, and a projection system adapted to project an image corresponding with a selected master character on said film and on said layout surface, said holder and said layout surface being translatory in one direction, said projection system being translatory in a direction transversely of said one direction, said projection system comprising a source of light and including branching light paths, one of said light paths extending to said film and another of said light paths extending toward said layout surface.

90. In a photo-lettering machine, a holder for carrying a sensitized film, a layout surface, a plate upon which a row of master characters are formed, and a projection system adapted to project an image corresponding with a selected master character on said film and on said layout surface, said holder and said layout surface being translatory in one direction, said projection system and said plate being translatory in a direction transversely of said one direction, said projection system comprising a source of light and including branching light paths, one of said light paths extending to said film and another of said light paths extending toward said layout surface.

91. In a photo-printing machine, the combination with a layout surface, of a source of light and a group of master characters movable in one direction with respect to a sensitized surface, said layout surface and said sensitized surface being movable transversely of said one direction with respect to said source of light and said group of master characters.

92. In a photo-printing machine, the combination with a layout surface, of a source of light and a plate upon which a row of master characters are formed, said source of light and said plate being movable in one direction with respect to a sensitized surface, said layout surface and said sensitized surface being movable transversely of said one direction with respect to said source of light and said plate.

93. In a photo-printing machine, the combination with a layout surface, of a source of light and a plate upon which a row of master characters are formed, said plate being freely slidable in opposite directions with respect to said source of light, said source of light and said plate being movable in one direction with respect to a sensitized surface, said layout surface and said sensitized surface being movable transversely of said one direction with respect to said source of light and said plate.

94. In a photo-printing machine, the combination with a layout surface, of a source of light and a group of master characters movable in one direction with respect to a sensitized surface for letter spacing, said layout surface and said sensitized surface being movable as a unit transversely of said one direction for line spacing.

95. In a photo-printing machine, the combination with a layout surface, and a light-sensitive surface, of a source of light, and a group of master characters movable in opposite directions with respect thereto, said source of light and said group of characters being movable as a unit with respect to said layout and light-sensitive surfaces.

96. In a photo-printing machine, the combination with a layout surface, and a light-sensitive surface, of a source of light, and a plate upon which a row of master characters are formed, said plate being slidable in opposite directions with respect to said source of light, said source of light and said plate being movable as a unit with respect to said layout and light-sensitive surfaces.

97. In a photo-printing machine, the combination with a layout surface, and a light-sensitive surface, of a source of light, and a group of master characters movable in opposite directions with respect thereto, said source of light and said group of characters being movable as a unit with respect to said layout and light-sensitive surfaces, said layout and said light-sensitive surfaces being movable transversely of the path of said source of light and said group of characters.

98. In a photo-printing machine, a group of master characters, means for moving said group of characters at will in the same or opposite directions to successively position selected characters in the path of an image-forming light beam, a layout surface upon which images are formed by said light beam, and means for photographically fixing upon a recording medium images corresponding with the images appearing on said layout surface, said recording medium being movable independently of said group of characters.

99. In a photo-lettering machine, a holder for carrying a sensitized film, a layout surface, a projection system adapted to project an image corresponding with a selected master character on said layout surface and then on said film, and means whereby relative movement may be obtained in a plurality of different directions between said holder and layout surface on the one hand and said projection system on the other hand.

100. In a photo-lettering machine, a holder for carrying a sensitized film, a layout surface, a projection system adapted to project an image corresponding with a selected master character on said layout surface and then on said film, and means whereby relative movement may be obtained in directions related approximately at right angles between said holder and layout surface on the one hand and said projection system on the other hand.

In testimony whereof, I have affixed my signature to this specification.

ASHLEY G. OGDEN.